United States Patent
Zhang et al.

(10) Patent No.: US 12,541,357 B2
(45) Date of Patent: Feb. 3, 2026

(54) OPERATING SYSTEM UPGRADING METHOD, ELECTRONIC DEVICE, STORAGE MEDIUM, AND CHIP SYSTEM

(71) Applicant: Honor Device Co., Ltd., Shenzhen (CN)

(72) Inventors: Zenghui Zhang, Shenzhen (CN); Yanzhao Wang, Shenzhen (CN); Chao Chen, Shenzhen (CN); Jiulin Huang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 186 days.

(21) Appl. No.: 18/268,073

(22) PCT Filed: Dec. 19, 2022

(86) PCT No.: PCT/CN2022/140016
§ 371 (c)(1),
(2) Date: Jun. 16, 2023

(87) PCT Pub. No.: WO2023/130946
PCT Pub. Date: Jul. 13, 2023

(65) Prior Publication Data
US 2024/0378043 A1    Nov. 14, 2024

(30) Foreign Application Priority Data

Jan. 10, 2022  (CN) .......................... 202210023196.0
Feb. 14, 2022  (CN) .......................... 202210135613.0

(51) Int. Cl.
*G06F 8/65*            (2018.01)
(52) U.S. Cl.
CPC ..................................... *G06F 8/65* (2013.01)

(58) Field of Classification Search
CPC ...... G06F 8/65; G06F 9/4406; G06F 9/44505; G06F 11/1433; G06F 9/445; G06F 8/658; G06F 8/71
See application file for complete search history.

(56) References Cited

U.S. PATENT DOCUMENTS

| | | | | |
|---|---|---|---|---|
| 8,635,425 B1 * | 1/2014 | Adogla | ..................... | G06F 8/63 714/710 |
| 8,924,952 B1 * | 12/2014 | Hou | .......................... | G06F 8/65 717/172 |

(Continued)

FOREIGN PATENT DOCUMENTS

| CN | 109189442 A | 1/2019 |
|---|---|---|
| CN | 113805914 A | 12/2021 |

(Continued)

*Primary Examiner* — Wei Y Mui
*Assistant Examiner* — Vivian Weijia Duan
(74) *Attorney, Agent, or Firm* — Slater Matsil, LLP

(57) ABSTRACT

A method includes: obtaining a first upgrade installation package and a second upgrade installation package, where the first upgrade installation package includes—partition information of a first sub-partition, the second upgrade installation package includes—partition information of a second sub-partition; obtaining a plurality of third description groups based on third data and a plurality of second description groups, where the third data includes the partition information of the first sub-partition and the partition information of the second sub-partition, and the plurality of third description groups include description groups respectively corresponding to the first sub-partition, the second sub-partition, and a third sub-partition; and restarting an electronic device, loading data in a dynamic partition based on values of the address entries in the plurality of third description groups.

16 Claims, 29 Drawing Sheets

(56) References Cited

U.S. PATENT DOCUMENTS

| | | | |
|---|---|---|---|
| 2007/0067366 A1* | 3/2007 | Landis | G06F 12/109 |
| 2007/0294685 A1 | 12/2007 | Oh | |
| 2009/0307477 A1 | 12/2009 | Matthew et al. | |
| 2011/0208929 A1* | 8/2011 | McCann | G06F 3/0664 |
| | | | 718/1 |
| 2015/0046749 A1* | 2/2015 | Kumagai | G06F 11/1417 |
| | | | 714/15 |
| 2018/0052674 A1* | 2/2018 | Freese | G06F 16/178 |
| 2022/0100403 A1* | 3/2022 | Tiwari | G06F 11/1441 |
| 2022/0100490 A1* | 3/2022 | Hwang | G06F 16/168 |

FOREIGN PATENT DOCUMENTS

| | | |
|---|---|---|
| CN | 113805956 A | 12/2021 |
| CN | 113821233 A | 12/2021 |
| JP | 2014191573 A | 10/2014 |

* cited by examiner

```
Partition table:

Name: system_a
Group: qti_dynamic_partitions_a
     Attributes: readonly
          Extents:
  0..6995967 linear super 2048

Name: system_b
Group: qti_dynamic_partitions_b
     Attributes: readonly
          Extents:

Name: system__ext_a
Group: qti_dynamic_partitions_a
     Attributes: readonly
          Extents:
  0..262143 linear super 6998016

Name: system_ext_b
Group: qti_dynamic_partitions_b
     Attributes: readonly
          Extents:
```

CONT.
FROM
FIG. 5A(1)

┌─────────────────────────────────────────────────────────────────────────┐
│ The device creates a virtual dynamic partition in a user data partition (Userdata) based │ ─ S540
│ on the operating system upgrade installation package, and stores, in the virtual dynamic │
│ partition, upgrade data of the dynamic partition (Super) by using the cow file │
└─────────────────────────────────────────────────────────────────────────┘
                                    ↓
┌─────────────────────────────────────────────────────────────────────────┐
│ Change a device startup sequence from being started from the static partition (A) to │ ─ S231
│           being started from the static partition (B)                    │
└─────────────────────────────────────────────────────────────────────────┘
                                    ↓
┌─────────────────────────────────────────────────────────────────────────┐
│                        The device is restarted                           │ ─ S232
└─────────────────────────────────────────────────────────────────────────┘
                                    ↓
┌─────────────────────────────────────────────────────────────────────────┐
│ The device sequentially loads the basic partition (Common) and the static partition (B), │ ─ S240
│              and is started from the static partition (B)                │
└─────────────────────────────────────────────────────────────────────────┘
                                    ↓
┌─────────────────────────────────────────────────────────────────────────┐
│ The device loads cow files in the dynamic partition (Super) and the virtual dynamic │ ─ S550
│ partition in the user data partition (Userdata) based on the adjusted slot1 and the index │
│                          of the cow file                                 │
└─────────────────────────────────────────────────────────────────────────┘
                                    ↓
┌─────────────────────────────────────────────────────────────────────────┐
│      The device is successfully started and enters a user interaction interface │ ─ S250
└─────────────────────────────────────────────────────────────────────────┘
                                    ↓
┌─────────────────────────────────────────────────────────────────────────┐
│ The device merges the data in the virtual dynamic partition into the dynamic partition │ ─ S251
│                              (Super)                                     │
└─────────────────────────────────────────────────────────────────────────┘

FIG. 5A(2)

Slot1 (before adjustment)

```
Name: system_a
Group: ry_dynamic_partitions_a
Attributes: readonly
Extents:
---------------------
Name: system_b
Group: ry_dynamic_partitions_b
Attributes: readonly
Extents: 0 .. 6995967 linear super 2048
---------------------
Name: product_a
Group: ry_dynamic_partitions_a
Attributes: readonly
Extents:
---------------------
Name: product_b
Group: ry_dynamic_partitions_b
Attributes: readonly
Extents: 0 .. 65535 linear super 6998016
---------------------
Name: system_ext_a
Group: ry_dynamic_partitions_a
Attributes: readonly
Extents:
---------------------
Name: system_ext_b
Group: ry_dynamic_partitions_b
Attributes: readonly
Extents: 0 .. 262143 linear super 7063552
---------------------
Name: vendor_a
Group: ry_dynamic_partitions_a
Attributes: readonly
Extents:
---------------------
Name: vendor_b
Group: ry_dynamic_partitions_b
Attributes: readonly
Extents:0 .. 1843199 linear super 7325696
---------------------
Name: odm_a
Group: ry_dynamic_partitions_a
Attributes: readonly
Extents:
---------------------
Name: odm_b
Group: ry_dynamic_partitions_b
Attributes: readonly
Extents: 0 .. 1949695 linear super 9431040
---------------------
Name: cust_a
Group: ry_dynamic_partitions_a
Attributes: readonly
Extents:
---------------------
Name: cust_b
Group: ry_dynamic_partitions_b
Attributes: readonly
Extents: 0 .. 180223 linear super 16263168
```

(a)

Slot1 (after adjustment)

```
Name: system_b
Group: ry_dynamic_partitions_b
Attributes: readonly
Extents:0 .. 6995967 linear super 2048
---------------------
Name: product_b
Group: ry_dynamic_partitions_b
Attributes: readonly
Extents:0 .. 65535 linear super 6998016
---------------------
Name: odm_b
Group: ry_dynamic_partitions_b
Attributes: readonly
Extents:0 .. 1949695 linear super 9431040
---------------------
Name: cust_b
Group: ry_dynamic_partitions_b
Attributes: readonly
Extents:0 .. 180223 linear super 16263168
```

CONT.
FROM
FIG. 9A

```
↓
```

The device creates a virtual dynamic partition in a user data partition (Userdata) based on the plurality of upgrade packages, and sequentially performs a data writing operation on a static partition (B) based on the plurality of upgrade packages to upgrade the static partition, and writes upgrade data of the dynamic partition (Super) into the virtual dynamic partition, where in the virtual dynamic partition, the cow file is used to store the upgrade data of the dynamic partition (Super) — S906

Change a device startup sequence from being started from the static partition (A) to being started from the static partition (B) — S907

The device is restarted — S908

The device sequentially loads the basic partition (Common) and the static partition (B), and is started from the static partition (B) — S909

The device loads the dynamic partition (Super) and the virtual dynamic partition in the user data partition (Userdata) based on the adjusted slot1 and the index of the cow file — S910

The device is successfully started and enters a user interaction interface — S911

The device merges the data in the virtual dynamic partition into the dynamic partition (Super) — S912

FIG. 9B

Slot1 (before adjustment)

```
Name: system_b
Group: ry_dynamic_partitions_b
Attributes: readonly
Extents: 0 .. 6995967 linear super 2048
----------------------
Name: product_b
Group: ry_dynamic_partitions_b
Attributes: readonly
Extents: 0 .. 65535 linear super 6998016
----------------------
Name: system_ext_b
Group: ry_dynamic_partitions_b
Attributes: readonly
Extents: 0 .. 262143 linear super 7063552
----------------------
Name: vendor_b
Group: ry_dynamic_partitions_b
Attributes: readonly
Extents:0 .. 1843199 linear super 7325696
----------------------
Name: odm_b
Group: ry_dynamic_partitions_b
Attributes: readonly
Extents: 0 .. 1949695 linear super 9431040
----------------------
Name: cust_b
Group: ry_dynamic_partitions_b
Attributes: readonly
Extents: 0 .. 180223 linear super 16263168
----------------------
Name: version_b
Group: ry_dynamic_partitions_b
Attributes: readonly
Extents:0 .. 65535 linear super 17295360
----------------------
Name: preload_b
Group: ry_dynamic_partitions_b
Attributes: readonly
Extents:0 .. 3080191 linear super 17360896
```

(a)

Slot1 (after adjustment)

```
Name: system_b
Group: ry_dynamic_partitions_b
Attributes: readonly
Extents: 0 .. 6995967 linear super 2048
----------------------
Name: product_b
Group: ry_dynamic_partitions_b
Attributes: readonly
Extents: 0 .. 65535 linear super 6998016
----------------------
Name: system_ext_b
Group: ry_dynamic_partitions_b
Attributes: readonly
Extents: 0 .. 262143 linear super 7063552
----------------------
Name: vendor_b
Group: ry_dynamic_partitions_b
Attributes: readonly
Extents:0 .. 1843199 linear super 7325696
----------------------
Name: odm_b
Group: ry_dynamic_partitions_b
Attributes: readonly
Extents: 0 .. 1949695 linear super 9431040
----------------------
Name: cust_b
Group: ry_dynamic_partitions_b
Attributes: readonly
Extents: 0 .. 180223 linear super 16263168
```
```
Name: version_b
Group: ry_dynamic_partitions_b
Attributes: readonly
Extents:0 .. 65535 linear super 17295360
----------------------
Name: preload_b
Group: ry_dynamic_partitions_b
Attributes: readonly
Extents:0 .. 3080191 linear super 17360896
```

CONT.
FROM
FIG. 12A

The device creates a virtual dynamic partition in a user data partition (Userdata) based on the plurality of upgrade packages, and sequentially performs a data writing operation on the static partition (B) based on the plurality of upgrade packages to upgrade the static partition, and writes upgrade data of the dynamic partition (Super) into the virtual dynamic partition, where in the virtual dynamic partition, the cow file is used to store the upgrade data of the dynamic partition (Super) ⟵ S906

Change a device startup sequence from being started from the static partition (A) to being started from the static partition (B) ⟵ S907

The device is restarted ⟵ S908

The device sequentially loads the basic partition (Common) and the static partition (B), and is started from the static partition (B) ⟵ S909

The device loads the dynamic partition (Super) and the virtual dynamic partition in the user data partition (Userdata) based on the adjusted slot1 and the index of the cow file ⟵ S910

The device is successfully started and enters a user interaction interface ⟵ S911

The device merges the data in the virtual dynamic partition into the dynamic partition (Super) ⟵ S912

FIG. 12B

First file (before adjustment)

```
Name: system_b
Group: ry_dynamic_partitions_b
Attributes: readonly
Extents: 0 .. 6995967 linear super 2048
----------------------
Name: product_b
Group: ry_dynamic_partitions_b
Attributes: readonly
Extents: 0 .. 65535 linear super 6998016
----------------------
Name: system_ext_b
Group: ry_dynamic_partitions_b
Attributes: readonly
Extents: 0 .. 262143 linear super 7063552
----------------------
Name: vendor_b
Group: ry_dynamic_partitions_b
Attributes: readonly
Extents:0 .. 1843199 linear super 7325696
----------------------
Name: odm_b
Group: ry_dynamic_partitions_b
Attributes: readonly
Extents: 0 .. 1949695 linear super 9431040
----------------------
Name: cust_b
Group: ry_dynamic_partitions_b
Attributes: readonly
Extents: 0 .. 180223 linear super 16263168
----------------------
Name: version_b
Group: ry_dynamic_partitions_b
Attributes: readonly
Extents:0 .. 65535 linear super 17295360
----------------------
Name: preload_b
Group: ry_dynamic_partitions_b
Attributes: readonly
Extents:0 .. 3080191 linear super 17360896
```

(a)

} Delete

First file (after adjustment)

```
Name: version_b
Group: ry_dynamic_partitions_b
Attributes: readonly
Extents:0 .. 65535 linear super 17295360
```

OPERATING SYSTEM UPGRADING METHOD, ELECTRONIC DEVICE, STORAGE MEDIUM, AND CHIP SYSTEM

CROSS-REFERENCE TO RELATED APPLICATIONS

This application is a national stage of International Application No. PCT/CN2022/140016 filed on Dec. 19, 2022, which claims priorities to Chinese Patent Application No. 202210023196.0 filed on Jan. 10, 2022, and Chinese Patent Application No. 202210135613.0 filed on Feb. 14, 2022. All of the aforementioned applications are hereby incorporated by reference in their entireties.

TECHNICAL FIELD

This application relates to the field of computer technologies, and in particular, to an operating system upgrading method, an electronic device, a storage medium, and a chip system.

BACKGROUND

In a terminal device such as a mobile phone or a notebook computer, an operating system is the most basic and the most important fundamental system software. The terminal device can be used by a user only when the operating system is installed. For example, the terminal device is a mobile phone. A mobile phone operating system such as an iPhone operating system (iPhone Operating System, IOS) or an Android (Android) system needs to be installed on the mobile phone before the mobile phone can be used by the user.

Generally, the operating system is provided by an operating system supplier (for example, a supplier of the Android system is Google). In addition, the operating system provided by the operating system supplier is a basic operating system, includes only the most basic functions, and cannot fully meet an application requirement of the user. Therefore, to meet the application requirement of the user and improve user experience, a terminal device supplier optimizes the basic operating system based on different customer requirements and application scenarios, and adds customized content to the basic operating system, to construct a customized operating system. After the customized operating system is installed on the terminal device, the terminal device can provide an optimized system function. For example, the terminal device is a mobile phone on which the Android system is installed. Before the mobile phone is delivered from a factory, a customer service system of a specified network operator is added to the Android system, so that the mobile phone can log in to a user account of the user for the network operator after being powered on, to implement functions such as charging and top-up.

After the customized operating system is installed on the terminal device, when a version is upgraded, the customized operating system installed on the terminal device needs to be upgraded. In addition, in the customized operating system, for a large quantity of upgrading requirements, only data in some storage areas in the customized operating system needs to be upgraded.

However, a current operating system upgrading solution is provided by the operating system supplier. The upgrading solution provided by the operating system supplier is usually for overall upgrade of the operating system. If the upgrading solution is used for an upgrading requirement of the customized operating system, when data in any storage area of the customized operating system needs to be upgraded, a new version of a part that needs to be upgraded and a current version of a part that does not need to be upgraded need to be combined into a new version, and then the new version is released, that is, a combined upgrade package is released. Then, the entire customized operating system is upgraded based on the combined upgrade package. In this way, as the upgrading requirement of the customized operating system increases, a large quantity of upgrade packages of a high version are obtained. This is not conducive to flexible management of a version of the customized operating system by the terminal device supplier.

SUMMARY

Embodiments of this application provide an operating system upgrading method, an electronic device, a storage medium, and a chip system, to upgrade a combination of a plurality of sub-partitions in an operating system, so that various upgrading requirements are flexibly met.

According to a first aspect, an embodiment of this application provides an operating system upgrading method, and the method may be applied to an electronic device. The electronic device includes a processor and a memory, the memory includes a basic partition, a first static partition, a second static partition, a dynamic partition, and a user data partition, the dynamic partition includes first slot data and second slot data, the dynamic partition includes a plurality of sub-partitions, the first slot data includes a plurality of first description groups corresponding to the plurality of sub-partitions, and the second slot data includes a plurality of second description groups corresponding to the plurality of sub-partitions. Data in the basic partition, the first static partition, and the dynamic partition is loaded to run a first operating system, the plurality of first description groups are read in a process of loading the data in the dynamic partition, and the data in the dynamic partition is loaded based on values of address entries in the plurality of first description groups. A first upgrade installation package and a second upgrade installation package are obtained, where the first upgrade installation package is used to upgrade a first sub-partition, the second upgrade installation package is used to upgrade a second sub-partition, the first sub-partition and the second sub-partition are sub-partitions in the dynamic partition, the first upgrade installation package includes first data (manifest), the first data includes partition information of the first sub-partition, the second upgrade installation package includes second data, and the second data includes partition information of the second sub-partition. A plurality of third description groups are obtained based on third data and the plurality of second description groups, where the third data includes the partition information of the first sub-partition and the partition information of the second sub-partition, the plurality of third description groups include a description group corresponding to the first sub-partition, a description group corresponding to the second sub-partition, and a description group corresponding to a third sub-partition, and the third sub-partition is a sub-partition in the dynamic partition other than the first sub-partition and the second sub-partition. The electronic device is restarted, data in the basic partition, the second static partition, and the dynamic partition is loaded to run a second operating system, values of address entries in the plurality of third description groups are read in the process of loading the data in the dynamic partition, and the data in the dynamic partition is loaded based on the values of the address entries in the plurality of third description groups.

In summary, in the method in this embodiment of this application, after obtaining a plurality of (for example, two) upgrade installation packages, the electronic device merges manifest obtained through parsing from the plurality of upgrade installation packages to obtain manifest including all sub-partitions (for example, the first sub-partition and the second sub-partition) that need to be upgraded in the dynamic partition. Then, in a process of obtaining the plurality of third description groups based on the merged manifest, a sub-partition (for example, the third sub-partition) that is not involved in partition information of the manifest is not deleted from the second slot data. In this way, a description group of a sub-partition that is not upgraded still remains in the second slot data. When the second operating system is subsequently run, data in the sub-partition that is not upgraded may be loaded based on the second slot data. Therefore, a case of incomplete loading does not occur, and the dynamic partition can be successfully loaded finally.

In a possible design manner of the first aspect, after the obtaining a first upgrade installation package and a second upgrade installation package, the method further includes: writing the plurality of second description groups into a target file, deleting the description group corresponding to the third sub-partition from the target file, and generating a first index.

In other words, when creating the first index, the electronic device deletes a description group corresponding to a sub-partition that is not upgraded in the plurality of second description groups, so that the created first index may only instruct the electronic device to obtain upgrade data of an upgraded sub-partition. Therefore, the electronic device can be accurately instructed to obtain the upgrade data.

In a possible design manner of the first aspect, the target file is located in the basic partition.

In a possible design manner of the first aspect, after the loading data in the basic partition, the first static partition, and the dynamic partition, the method further includes: obtaining a third upgrade installation package, where the third upgrade installation package is used to upgrade a fourth sub-partition, the fourth sub-partition is a sub-partition in the dynamic partition, the third upgrade installation package includes the third data, and the third data includes partition information of the fourth sub-partition; and obtaining the plurality of third description groups based on the third data and the plurality of second description groups, where the third data further includes the partition information of the fourth sub-partition, and the third sub-partition is a sub-partition in the dynamic partition other than the first sub-partition, the second sub-partition, and the fourth sub-partition.

In other words, in the method in this embodiment, more sub-partitions may alternatively be upgraded by using three upgrade installation packages. It should be understood that four upgrade installation packages, five upgrade installation packages, or the like may alternatively be used to flexibly implement various combined upgrading requirements. This is not specifically limited in this embodiment of this application.

In a possible design manner of the first aspect, the first upgrade installation package includes first upgrade data, the first upgrade data is used to upgrade the first sub-partition, the second upgrade installation package includes second upgrade data, and the second upgrade data is used to upgrade the second sub-partition; and the method further includes: storing the first upgrade data and the second upgrade data in the user data partition; and reading the target file in the process of loading the data in the dynamic partition, and loading the first upgrade data and the second upgrade data in the user data partition based on the first index in the target file.

In other words, in the method in this embodiment, in a scenario in which a plurality of upgrade installation packages are upgraded in combination, the electronic device sequentially traverses the plurality of upgrade installation packages, to write upgrade data in each upgrade installation package into the user data partition instead of storing data only for one upgrade installation package, so that omissions can be avoided, and entire upgrading of various combinations is implemented. Then, during loading of the dynamic partition, all upgrade data needs to be obtained from the user data partition, so that the dynamic partition is entirely loaded.

In a possible design manner of the first aspect, the deleting the description group corresponding to the second sub-partition from the target file, and generating a first index includes: deleting the description group corresponding to the third sub-partition from the target file, to obtain the description group corresponding to the first sub-partition and the description group corresponding to the second sub-partition, where the description group corresponding to the first partition includes a name of the first sub-partition, and the description group corresponding to the second sub-partition includes a name of the second sub-partition; and generating, based on the name of the first sub-partition, a first file name corresponding to the first sub-partition, and generating, based on the name of the second sub-partition, a second file name corresponding to the second sub-partition, where the first index includes the first file name and the second file name.

In other words, in the method in this embodiment, the electronic device may generate the first index including the first file name and the second file name, to accurately indicate a file in which upgrade data that the electronic device needs to find when loading the dynamic partition is located.

In another possible design manner of the first aspect, after the generating, based on the name of the first sub-partition, a first file name corresponding to the first sub-partition, and generating, based on the name of the second sub-partition, a second file name corresponding to the second sub-partition, the method further includes: creating, in the user data partition, a first initial cow file whose file name is the first file name and a second initial cow file whose file name is the second file name, where no upgrade data is stored in the first initial cow file and the second initial cow file; and the storing the user data partition upgrade data and the second upgrade data in the user data partition includes: storing the first upgrade data in the first initial cow file, and storing the second upgrade data in the second initial cow file.

In other words, in the method in this embodiment, the electronic device may create, in the user data partition, an initial cow file with a file name that is consistent with that in the first index, and store upgrade data in the initial cow file. Subsequently, when reading the upgrade data, the electronic device may accurately obtain the upgrade data by retrieving the file name.

In another possible design manner of the first aspect, the second static partition includes a plurality of sub-partitions, the first upgrade installation package further includes third upgrade data, the third upgrade data is used to upgrade a fifth sub-partition, the second upgrade installation package further includes fourth upgrade data, the fourth upgrade data is used to upgrade a sixth sub-partition, and the fifth sub-partition and the sixth sub-partition are sub-partitions in the second static partition; and after the obtaining a first upgrade installation package and a second upgrade installation package, the method further includes: writing the third upgrade data into the fifth sub-partition, and writing the fourth upgrade data into the sixth sub-partition.

In other words, in the method in this embodiment, the electronic device may upgrade some sub-partitions in the dynamic partition and the static partition. Therefore, various partial upgrading requirements are flexibly met.

In another possible design manner of the first aspect, the first static partition includes a plurality of sub-partitions, and the plurality of sub-partitions in the first static partition are in a one-to-one correspondence with the plurality of sub-partitions in the second static partition. Before the writing the third upgrade data into the fifth sub-partition, and writing the fourth upgrade data into the sixth sub-partition, the method further includes: if the second static partition includes a seventh sub-partition, detecting whether the fifth sub-partition and the sixth sub-partition include a preset sub-partition, where the seventh sub-partition is a sub-partition in the second static partition other than the fifth sub-partition and the sixth sub-partition; and if the fifth sub-partition and the sixth sub-partition include the preset sub-partition, synchronizing data in the seventh sub-partition in the first static partition into the seventh sub-partition in the second static partition.

In other words, when data that needs to be upgraded currently is a large amount of data, the electronic device may synchronize only data in a sub-partition (that is, the seventh sub-partition) that does not need to be upgraded in the first static partition into the second static partition, to ensure that data in a sub-partition (that is, the seventh sub-partition) that does not need to be upgraded in the second static partition is the latest. Therefore, data in a sub-partition that currently does not need to be upgraded can be synchronized through synchronization of a small part of data.

If the fifth sub-partition and the sixth sub-partition do not include the preset sub-partition, data in all sub-partitions in the first static partition is synchronized into a corresponding sub-partition in the second static partition.

In this way, when most data does not need to be upgraded, the device does not need to remove data that does not need to be synchronized from the first static partition, so that a synchronization step can be simplified through entire synchronization.

In other words, in the method in this embodiment, before the data in the second static partition is updated, latest data in the sub-partition that does not need to be upgraded may be first kept synchronized between the first static partition and the second static partition. Then, the data in the second static partition is updated. In this way, it can be ensured that data in each sub-partition in the second static partition is the latest.

In another possible design manner of the first aspect, the writing the third upgrade data into the fifth sub-partition, and writing the fourth upgrade data into the sixth sub-partition includes: if the second static partition does not include the seventh sub-partition, writing the third upgrade data into the fifth sub-partition, and writing the fourth upgrade data into the sixth sub-partition. In other words, in the method in this embodiment, if all data in the static partition needs to be updated, the data may be directly updated without being synchronized. Therefore, system upgrading operations can be reduced.

In another possible design manner of the first aspect, the storing the first upgrade data and the second upgrade data in the user data partition includes: traversing the first upgrade installation package and the second upgrade installation package, storing the first upgrade data in the user data partition when the first upgrade installation package is traversed, and storing the second upgrade data in the user data partition when the second upgrade installation package is traversed; and the method further includes: recording a storage progress of upgrade data included in a currently traversed upgrade installation package, and recording a traversing sequence number of the currently traversed upgrade installation package; and calculating an update progress corresponding to the storage progress and the traversing sequence number, and displaying the update progress.

In other words, in the method in this embodiment, the electronic device may obtain a real-time update progress through calculation by recording the storage progress and the traversing sequence number, and display the real-time update progress.

In another possible design manner of the first aspect, in a process of storing the first upgrade data and the second upgrade data in the user data partition, the method further includes: if the electronic device is restarted after power-off, locating, in the first upgrade installation package and the second upgrade installation package, a target upgrade installation package corresponding to the traversing sequence number, and locating, in upgrade data of the target upgrade installation package, target data corresponding to the writing progress; and continuing to store the first upgrade data and the second upgrade data in the user data partition from the target data of the target upgrade installation package.

In other words, in the method in this embodiment, for an exception of restart after power-off in a data updating process, the electronic device may accurately resume data storage from a location of updating at the moment of power-off.

In another possible design manner of the first aspect, before the obtaining a plurality of third description groups based on third data and the plurality of second description groups, the method further includes: merging the first data and the second data to obtain the third data.

In other words, in the method in this embodiment, manifest in a plurality of upgrade installation packages may be merged to obtain manifest including partition information of all sub-partitions that need to be upgraded in the dynamic partition. This facilitates subsequent upgrade performed based on the merged manifest.

In another possible design manner of the first aspect, after the loading data in the basic partition, the second static partition, and the dynamic partition, the method further includes: merging a plurality of pieces of first upgrade data and a plurality of pieces of second upgrade data in the user data partition into a corresponding sub-partition in the dynamic partition.

In other words, in the method in this embodiment, through a merging operation, data in a file in the dynamic partition is upgraded, so that the device does not need to load the dynamic partition or a virtual dynamic partition when being started next time, and the device can be started only by loading the dynamic partition.

In another possible design manner of the first aspect, the first sub-partition, the second sub-partition, the third sub-partition, . . . may each include one or more sub-partitions. Therefore, various sub-partitions can be flexibly upgraded in combination.

According to a second aspect, an embodiment of this application further provides an electronic device. The electronic device includes a processor and a memory, the memory includes a basic partition, a first static partition, a second static partition, a dynamic partition, and a user data partition, the dynamic partition includes a plurality of sub-partitions, and the processor is configured to execute software code stored in the memory, to enable the electronic device to perform the method according to the first aspect and any possible design manner of the first aspect.

According to a third aspect, an embodiment of this application provides a chip system. The chip system is applied to an electronic device including a display and a memory; the chip system includes one or more interface circuits and one or more processors; the interface circuit and the processor are interconnected by using a wire; the interface circuit is configured to receive a signal from the memory of the electronic device and send the signal to the processor, where the signal includes computer instructions stored in the memory; and when the processor executes the computer instructions, the electronic device performs the method according to the first aspect and any possible design manner of the first aspect.

According to a fourth aspect, an embodiment of this application further provides a computer storage medium. The computer storage medium includes computer instructions, and when the computer instructions are run on an electronic device, the electronic device is enabled to perform the method according to the first aspect and any possible design manner of the first aspect.

According to a fifth aspect, this application provides a computer program product. When the computer program product is run on a computer, the computer is enabled to perform the method according to the first aspect and any possible design manner of the first aspect.

It can be understood that for beneficial effects that can be achieved by the electronic device according to the second aspect, the chip system according to the third aspect, the computer storage medium according to the fourth aspect, and the computer program product according to the fifth aspect, refer to the beneficial effects in the first aspect and any possible design manner of the first aspect. Details are not described herein again.

BRIEF DESCRIPTION OF THE DRAWINGS

To describe the technical solutions in embodiments of this application more clearly, the following briefly describes the accompanying drawings that need to be used by the embodiments. It is clear that, the accompanying drawings in the following descriptions show merely some embodiments of this application, and a person of ordinary skill in the art may still derive other drawings from these accompanying drawings without creative efforts.

FIG. 4 is a schematic diagram of some slot data according to an embodiment of this application;

FIG. 9A and FIG. 9B are a flowchart of upgrade of an operating system according to an embodiment of this application;

FIG. 11 is a schematic diagram of adjusting slot data according to an embodiment of this application;

FIG. 12A and FIG. 12B are a flowchart of upgrade of an operating system according to an embodiment of this application;

FIG. 13 is a schematic diagram of creating an index according to an embodiment of this application;

DETAILED DESCRIPTION OF ILLUSTRATIVE EMBODIMENTS

It should be noted that, embodiments described in this specification are merely some embodiments rather than all embodiments of this application. Based on embodiments of this application, all other embodiments obtained by a person of ordinary skill in the art without creative efforts shall fall within the protection scope of this application.

For better understanding of technical solutions of this application, embodiments of this application are described in detail below with reference to the accompanying drawings.

Before a terminal device (a device for short) is delivered from a factory, an operating system is burned into the device, so that the operating system is installed before the device is delivered from the factory. Thereafter, to improve user experience, the operating system in the device may need to be upgraded. In this case, an over-the-air technology (Over-the-Air Technology, OTA) may be used to complete upgrading. The OTA is a technology for updating a version of an operating system of a device remotely by using a wireless network interface of the device, to remotely upgrade the version of the operating system of the device.

It should be noted that the device in embodiments of this application includes but is not limited to a smartphone, a smart headset, a tablet computer, a smart refrigerator, a smart speaker, and the like on which an operating system can be installed. The device may alternatively be a control board on which the operating system can be installed inside the device. Example embodiments of the operating system include but are not limited to iOS®, Android®, Harmony®, Windows®, Linux, or another operating system.

When the OTA is used to upgrade the operating system, to perform perception-free upgrade during normal running of the device and improve utilization of data storage space, a virtual A/B upgrade solution may be used to upgrade the operating system.

Figure 1:
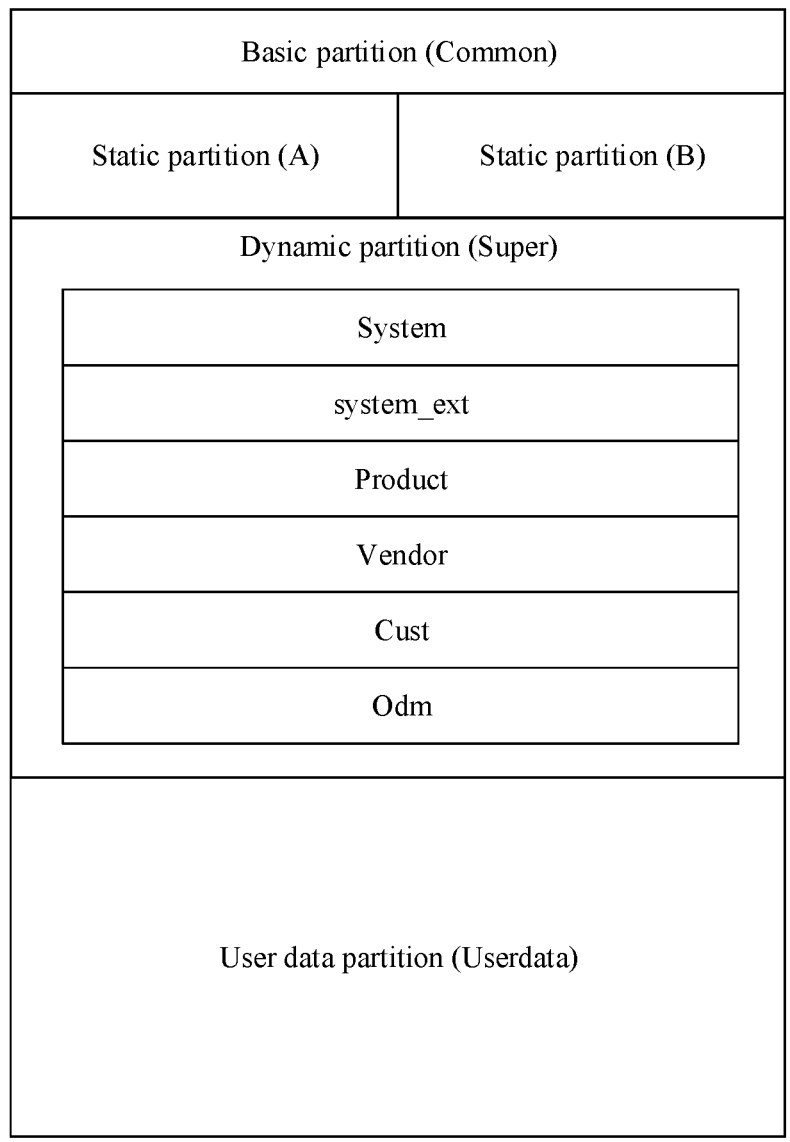
FIG. 1 is a schematic diagram of a data storage structure according to an embodiment of this application.

An Android system is used as an example. The virtual A/B upgrade solution may be applied to upgrade of an operating system with a data storage structure shown in FIG. 1. As shown in FIG. 1, a data storage area of the Android system includes a basic partition (Common), a static partition (A), a static partition (B), a dynamic partition (Super), and a user data partition (Userdata). The partitions are described as follows: The user data partition (Userdata) is used to store personal data of a user, for example, personal data such as an APP installed by the user personally, and a picture, a document, and a video stored by the user personally. The basic partition (Common) is used to store system data, and data stored in the basic partition does not participate in upgrade of the operating system. A structure of the static partition (A) and a structure of the static partition (B) correspond to each other. The static partition (A) and the static partition (B) may include a plurality of sub-partitions. Names of sub-partitions corresponding to the static partition (A) and the static partition (B) are distinguished from each other by using suffixes _a and _b. For example, the static partition (A) includes bootloader_a, boot_a, vendor_boot_a, dtbo_a, and vbmeta_a, and the static partition (B) includes bootloader_b, boot_b, vendor_boot_b, dtbo_b, and vbmeta_b. The dynamic partition (Super) includes a plurality of sub-partitions, such as System, system_ext, vendor, product, Cust, and Odm. For ease of description, the static partition (A) may be referred to as a first static partition, and the static partition (B) may be referred to as a second static partition.

When the device is started, the device is started from one static partition; in other words, the static partition is loaded to start the operating system. For example, when the device is started from the static partition (A), the basic partition (Common), the static partition (A), and the dynamic partition (Super) need to be sequentially loaded; and when the device is started from the static partition (B), the basic partition (Common), the static partition (B), and the dynamic partition (Super) need to be sequentially loaded.

For example, a universal flash storage (Universal Flash Storage, UFS) in a master boot record (Master Boot Record, MBR) format is used. A device startup sequence description is stored in an MBR (a master boot sector, a first sector of the UFS, that is, Cylinder 0 Head 0 Sector 1 in a C/H/S address) of the UFS. The device startup sequence description may be used to indicate startup from the static partition (A) (a start sequence tag is A) or startup from the static partition (B) (a start sequence tag is B). After the device is started, the device startup sequence description is first read from the MBR of the UFS, so that it is determined, based on the device startup sequence description, whether the device needs to be started from the static partition (A) or the static partition (B). The MBR is usually recorded in the basic partition (Common). Certainly, the MBR may alternatively be recorded at different locations on different platforms. This is not specifically limited in this embodiment of this application.

Figure 2:
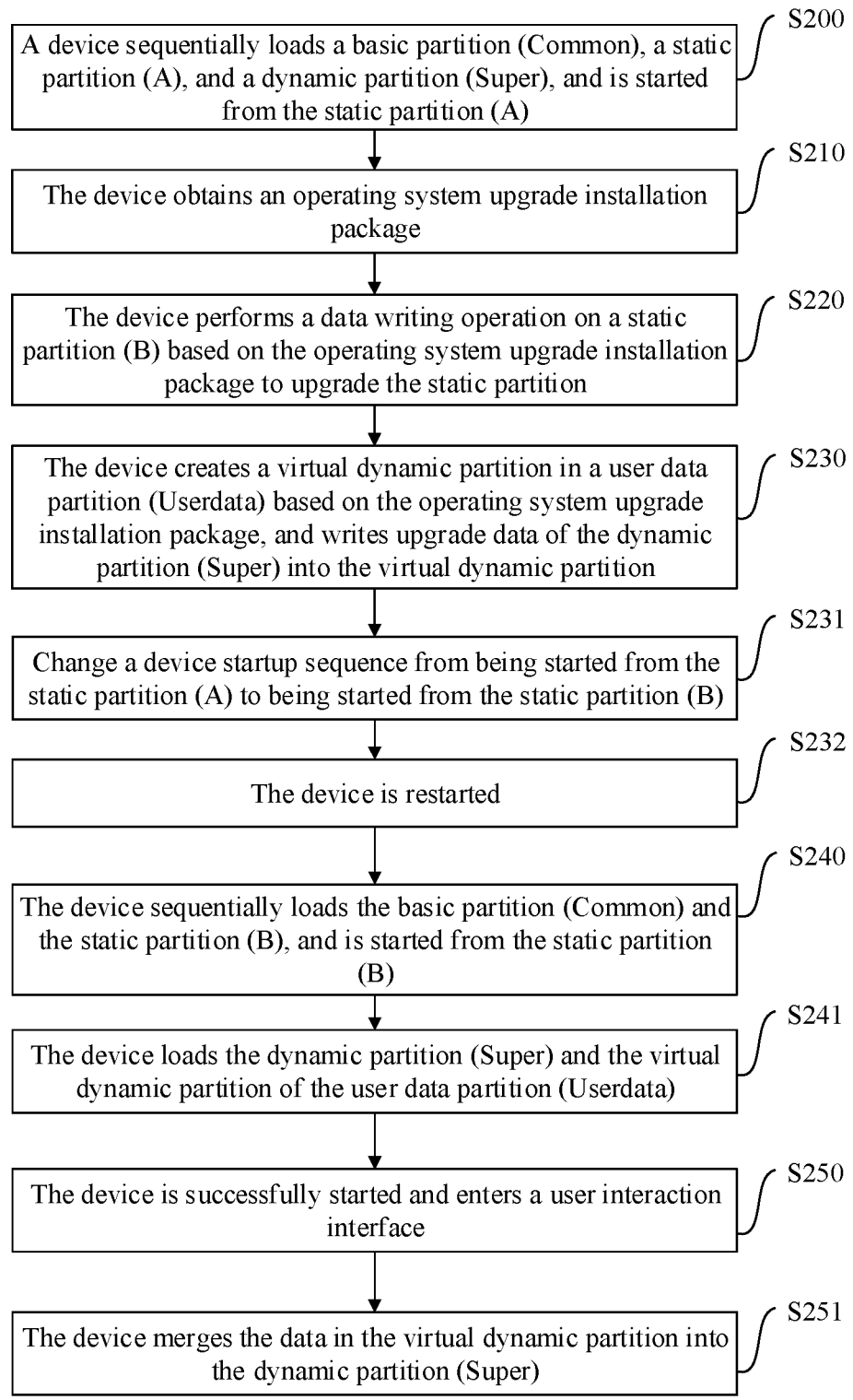
FIG. 2 is a flowchart of upgrade of an operating system according to an embodiment of this application.

FIG. 2 is a flowchart of upgrading an operating system with the data storage structure shown in FIG. 1. It is assumed that the device is currently started from the static partition (A), and the operating system of the device is upgraded based on a procedure of the virtual A/B upgrade solution shown in FIG. 2.

S200: The device sequentially loads a basic partition (Common), a static partition (A), and a dynamic partition (Super), and is started from the static partition (A).

S210: The device obtains an operating system upgrade installation package.

For example, in a feasible implementation solution, the device periodically initiates a packet search request to a packet search server, and the packet search request includes a version number (for example, a version 1.1) of an operating system currently run by the device. The packet search server retrieves, based on the version number of the operating system in the packet search request, whether there is currently an operating system installation package with an updated version number (for example, an operating system installation package of a version 1.2). When there is an operating system installation package of an updated version, the packer search server feeds back a downloading address of the operating system installation package (for example, a system incremental upgrade installation package upgraded from the version 1.1 to the version 1.2) to the device. The device downloads the operating system upgrade installation package based on the downloading address of the operating system upgrade installation package.

S220: The device performs a data writing operation on a static partition (B) based on the operating system upgrade installation package to upgrade the static partition (B).

For example, the system incremental upgrade installation package upgraded from the version 1.1 to the version 1.2 includes full data in a static partition of the version 1.2, and the device rewrites the data in the static partition of the version 1.2 into the static partition (B).

S230: The device creates a virtual dynamic partition in a user data partition (Userdata) based on the operating system upgrade installation package, and writes upgrade data of the dynamic partition (Super) into the virtual dynamic partition.

For example, the operating system upgrade installation package includes data in a dynamic partition (Super) of the version 1.2, and the device writes the data in the dynamic partition (Super) of the version 1.2 into the virtual dynamic partition.

Further, in the virtual A/B upgrade solution, an incremental upgrading manner is used for the dynamic partition (Super). In an upgrading process, the virtual dynamic partition of the user data partition (Userdata) stores not all files in a dynamic partition (Super) of a new version after upgrade, but an upgrade result, obtained after upgrade, of data that needs to be upgraded in a dynamic partition (Super) of a previous version.

A System sub-partition is used as an example. It is assumed that in the version 1.1, data in the System sub-partition may be divided into data system1 and data system2. During upgrade from the version 1.1 to the version 1.2, the data system2 remains unchanged, and the data system1 is upgraded to data system3. Therefore, in S230, the device creates the virtual dynamic partition in the user data partition (Userdata), and writes the data system3 into the virtual dynamic partition. For example, the system incremental upgrade installation package for upgrade from the version 1.1 to the version 1.2 includes dynamic partition (Super)

update data for upgrade from the version 1.1 to the version 1.2, and the dynamic partition (Super) update data includes the data system3.

Further, in the virtual A/B upgrade solution, incremental upgrade of the dynamic partition (Super) is implemented based on a snapshot (snapshot) technology. Specifically, in the virtual dynamic partition of the user data partition (Userdata), a copy-on-write (Copy-On-Write, cow) file is used to store the upgrade data of the dynamic partition (Super).

Specifically, upgrade data of the dynamic partition (Super) that is stored in the user data partition (Userdata) includes a plurality of cow files, and each cow file corresponds to one sub-partition in the dynamic partition (Super). In the operating system upgrade installation package, a cow file of the upgrade data of the dynamic partition (Super) is compressed and stored in a form of binary code, and each cow file is named based on a sub-partition that is in the dynamic partition (Super) and that is corresponding to the cow file. For example, a cow file for the system sub-partition is named system-cow-img.img.0000.

Further, after obtaining the operating system upgrade installation package and unpacking the operating system upgrade installation package to obtain all cow files, the device attaches an A/B partition tag to each cow file. Further, an Update folder is created in the user data partition (Userdata), and the cow file is stored in the Update folder.

For example, when the device is currently started from the static partition (A), it may be understood that a dynamic partition (Super) loaded by the device when currently running the operating system is a dynamic partition (A). During upgrade of the operating system, the virtual dynamic partition created in the user data partition (Userdata) is for a dynamic partition (B). Therefore, in S230, after obtaining the operating system upgrade installation package and unpacking the operating system upgrade installation package to obtain all the cow files, the device attaches a name tag _b corresponding to the dynamic partition (B) to the cow file. For example, _b is attached to system-cow-img.img.0000 to generate system_b-cow-img.img.0000. Further, an Update folder is created in the user data partition (Userdata), and the cow file is stored in the Update folder. For example, in an application scenario, after the cow file is written into the user data partition (Userdata), the Update folder of the user data partition (Userdata) includes the following files:

system_b-cow-img.img.0000;
   system_ext_b-cow-img.img.0000;
   vendor_b-cow-img.img.0000;
   product_b-cow-img.img.0000;
   cust_b-cow-img.img.0000;
   odm_b-cow-img.img.0000.

Specifically, the cow file includes a cow file map (a snapshot map) of the cow file and upgrade data.

The cow file map (snapshot) corresponds to a file map of a sub-partition that is in the dynamic partition (Super) and that the cow file is targeted at. The file map of the sub-partition in the dynamic partition (Super) is used to describe all files in a sub-partition in a dynamic partition (Super) of an operating system of a current version (a version used before current upgrade, for example, the version 1.1) and a storage address of each file.

The upgrade data in the cow file is updated data in data in the sub-partition of the new version compared with data in a sub-partition of the current version. The cow file map of the cow file is used to describe a correspondence between an updated file and a file in the sub-partition of the current version and a storage address of the updated file.

Based on the file map of the sub-partition in the dynamic partition (Super) and the cow file map in the cow file, the upgrade data in the cow file may be used to replace a corresponding file in the sub-partition in the dynamic partition (Super), to upgrade data in the dynamic partition (Super). Specifically, when the file map of the sub-partition in the dynamic partition (Super) needs to be obtained, a snapshot operation may be performed on the data in the sub-partition in the dynamic partition (Super) based on the snapshot, to generate the file map of the sub-partition in the dynamic partition (Super). The file map of the sub-partition in the dynamic partition (Super) may alternatively be generated in advance when the operating system upgrade installation package is created, and the file map is added to the cow file.

Further, in S230, after the cow file is written into the user data partition (Userdata), the dynamic partition (Super)+the cow file further need to be checked as a whole to check validity of the dynamic partition (Super)+the cow file, and check whether a result of synthesizing data in the dynamic partition (Super) of the current version+the cow file is data in a dynamic partition (Super) of a new version. If the dynamic partition (Super)+the cow file are valid, merging status information in a metadata partition (/metadata) of the basic partition (Common) is changed from "merged (merged)" to "wait for merge (wait for merge)". The merging status information is used to indicate whether there is currently a cow file that needs to be merged into the dynamic partition (Super). Specifically, the merging status information includes an overall identifier for the dynamic partition (Super) and a sub-partition identifier for each sub-partition. When the overall identifier is "merged (merged)", it indicates that a merging operation needs to be performed on none of all sub-partitions in the dynamic partition (Super). When the overall identifier is "wait for merge (wait for merge)", it indicates that a merging operation needs to be performed on one or more sub-partitions of the dynamic partition (Super). When the sub-partition identifier is "merged (merged)", it indicates that a merging operation does not need to be performed on the sub-partition. When the sub-partition identifier is "wait for merge (wait for merge)", it indicates that a merging operation needs to be performed on the sub-partition. If the dynamic partition (Super)+the cow file are invalid, upgrading fails, and an upgrading process is interrupted and an error is reported.

S231: Change a device startup sequence from being started from the static partition (A) to being started from the static partition (B).

For example, a startup sequence identifier of a master boot record (Master Boot Record, MBR) is rewritten, and the startup sequence identifier is rewritten from A to B. After the device is powered on, when the device reads that the startup sequence identifier is A, the device is started from the static partition (A), and loads the static partition (A) during startup; or when the device reads that the startup sequence identifier is B, the device is started from the static partition (B), and loads the static partition (B) during startup.

S232: The device is restarted. The current operating system is exited, the device is powered off, and the device is powered on again.

S240: The device sequentially loads the basic partition (Common) and the static partition (B).

S241: The device loads the dynamic partition (Super) and the virtual dynamic partition of the user data partition (Userdata).

Specifically, the device reads the merging status information in the metadata (/metadata), determines, based on the merging status information, whether to retrieve the cow file from a specified path of the user data partition (Userdata), and merges and loads cow files retrieved from the dynamic partition (Super) and the specified path of the user data partition (Userdata).

Further, in S241, the device does not load all cow files in the dynamic partition (Super) and the user data partition (Userdata), but loads a corresponding file based on an operating system running requirement. Specifically, in S241, the device determines, based on the operating system running requirement, a file that needs to be loaded, extracts, based on the snapshot, a corresponding file from the cow file in the dynamic partition (Super) or the virtual dynamic partition of the user data partition (Userdata), and loads the corresponding file.

Further, in S241, before loading the file, the device further needs to check the to-be-loaded file. Different from S230, in S241, the dynamic partition (Super)+the cow file are not verified as a whole, but only the file that needs to be loaded is verified. For example, checking is performed based on dmverity (dm-verity is a target (target) of dm (device mapper), is a virtual block device, and is specially used for checking of a file system). If the checking succeeds, the file is loaded. If the checking fails, the device is restarted. The system is rolled back or the file is loaded again.

S250: The device is successfully started and enters a user interaction interface.

S251: The device merges the data in the virtual dynamic partition into the dynamic partition (Super).

In the descriptions of the specification of this application, the merging operation means that in an operating system upgrading process, a dynamic partition (Super) upgrade file (cow file) stored in the virtual dynamic partition of the user data partition (Userdata) is written into the dynamic partition (Super), to upgrade data in the file in the dynamic partition (Super), so that the device does not need to load the dynamic partition (Super) or the virtual dynamic partition when being started next time, and the device can be started only by loading the dynamic partition (Super).

Specifically, the device performs power-on broadcasting after being successfully started, and starts an upgrading process after power-on broadcasting. In the upgrading process, the merging status information in the metadata (/metadata) in the basic partition (Common) is read. If the merging status information is "merged (merged)", the device enters a normal running mode.

If the merging status information is "wait for merge (wait for merge)", the cow file in the user data partition (Userdata) is merged into the dynamic partition (Super) in the upgrading process.

Specifically, in the upgrading process, the upgrade data in the cow file in the user data partition (Userdata) is written into a corresponding address in the dynamic partition (Super), so that all data in the dynamic partition (Super) is data of the new version after upgrade.

For example, data at addresses 045033~045035 is written into addresses 024014~024017 based on /system/app/A2. XXX: 024018~024020 in a file map of the system sub-partition and /system/app/A2. XXX: 045033~045035 in the cow file map; and data at addresses 045036~045040 is written into addresses 024036~024040 based on /system/user/C2. XXX: 024036~024040 in the file map of the system sub-partition and /system/user/C2. XXX: 045036~045040 in the cow file map.

Then, in the upgrading process, the cow file in the user data partition (Userdata) is deleted, and storage space is returned to the user data partition (Userdata). In addition, the merging status information in the metadata (/metadata) of the basic partition (Common) is changed from "wait for merge (wait for merge)" to "merged (merged)".

It may be learned from FIG. 2 that, in S220, data in a specific static partition is independently upgraded by using the static partition as a granularity, and upgrade between static partitions does not affect each other, for example, upgrade of operating system data in the static partition (B) does not affect operating system data of the currently started static partition (A). In addition, in S230, a data operation for upgrading the dynamic partition is completed on the virtual dynamic partition created in the user data partition (Userdata), and this does not affect the currently mounted dynamic partition (Super). Therefore, in an entire operating system upgrading process, a user can normally use the device, for example, use the data in the dynamic partition. In addition, after S231, the device does not need to be restarted immediately, but the user may autonomously select a restart occasion. In this way, the operating system upgrading process does not affect a normal mobile phone operation of the user. This greatly improves user experience. Further, for the dynamic partition (Super), the virtual dynamic partition is created in the user data partition (Userdata) only when upgrading needs to be performed. Therefore, utilization of data storage space is effectively improved.

Figure 3:
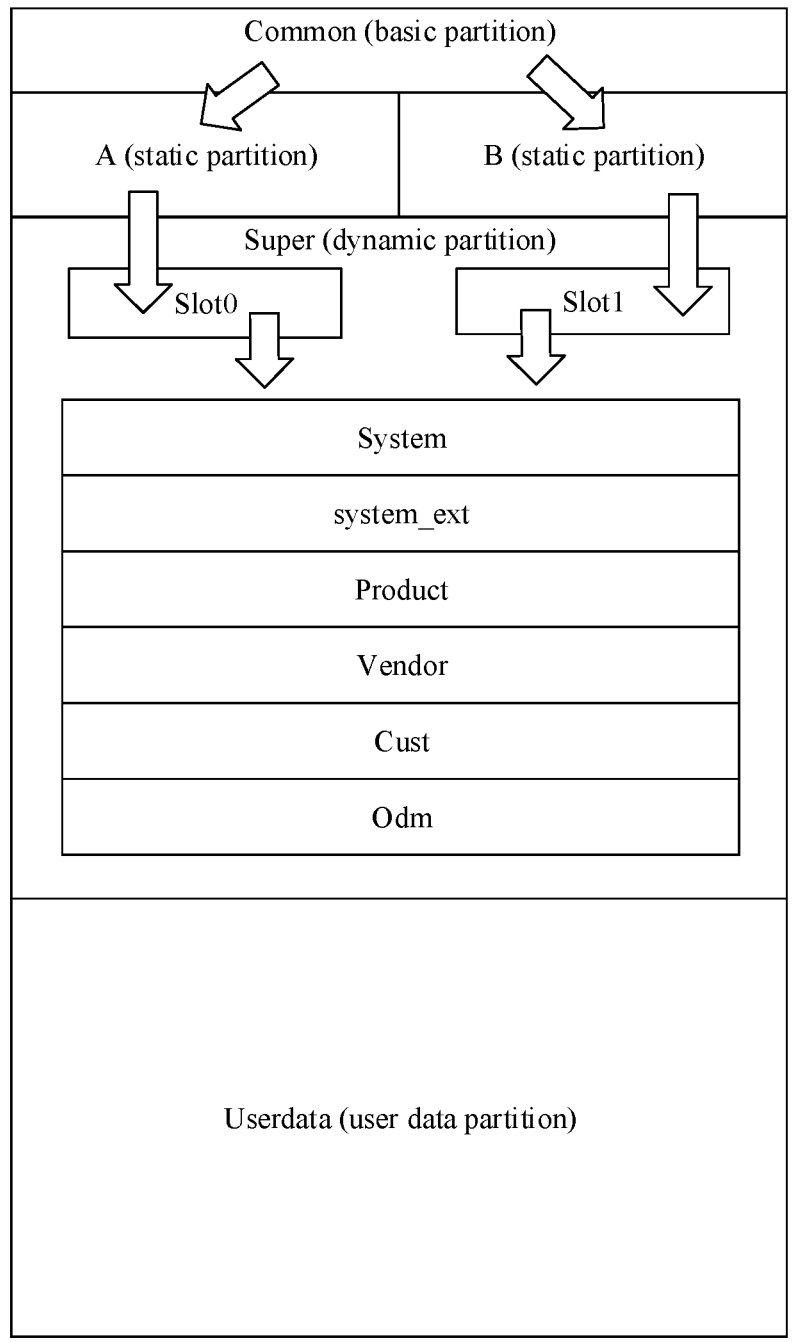
FIG. 3 is a schematic diagram of a data storage structure according to an embodiment of this application.

Further, FIG. 3 is a schematic diagram of a data storage structure according to an embodiment of this application. As shown in FIG. 3, metadata (/supermetadata) in a header of the dynamic partition (Super) includes Slot0 corresponding to the static partition (A) and Slot1 corresponding to the static partition (B). Slot0 and Slot1 are used to store a partition table of the Super partition. For ease of description, Slot0 corresponding to the static partition (A) may be referred to as a first slot, data in Slot0 is referred to as first slot data, Slot1 corresponding to the static partition (B) is referred to as a second slot, and data in Slot1 is referred to as second slot data.

For example, in the device startup sequence description in the MBR of the UFS, Slot0 is configured to correspond to starting from the static partition (A), and Slot1 is configured to correspond to starting from the static partition (B). When the device is started, the device chooses to obtain partition information of the Super partition from either Slot0 or Slot1 based on different static partitions used for starting. For example, the device is currently started from the static partition A, and when loading the dynamic partition (Super), the device first reads Slot0 to obtain a sub-partition address of the dynamic partition (Super). When the device is started from the static partition B, and when loading the Super partition, the device first reads Slot1 to obtain the sub-partition address of the dynamic partition (Super).

Specifically, Slot0 and Slot1 include a plurality of sub-partition description groups, and one sub-partition description group corresponds to one sub-partition in the Super partition. In other words, Slot0 includes a plurality of description groups corresponding to a plurality of sub-partitions, and Slot1 also includes a plurality of description groups corresponding to a plurality of sub-partitions. For ease of description, the plurality of sub-partition description groups in Slot0 may be referred to as a plurality of first description groups, and the plurality of sub-partition description groups in Slot1 may be referred to as a plurality of second description groups.

The sub-partition description group includes at least one of a name (Name) entry, a group (Group) entry, an attribute (Attributes) entry, and an address (Extents) entry. The entries included in the sub-partition description group are described below.

A value of the name (Name) entry is a name of a sub-partition, for example, system_b.

A value of the group (Group) entry is a type of a sub-partition, for example, a sub-partition (ry_dynamic_partitions_b).

A value of the attribute (Attributes) entry is a read/write attribute of a sub-partition, for example, a read-only attribute (readonly).

A value of the address (Extents) entry is an address of a sub-partition, for example, 0 . . . 6995967 linear super 2048.

In the Name entry and the Group entry, if a suffix of a value is _a, the value corresponds to the static partition (A); or if the suffix of the value is _b, the value corresponds to the static partition (B).

When the device is started from the static partition A, Slot0 is read first when the Super partition is being loaded. When Slot0 is read, because the suffix _a corresponds to the static partition (A), the device reads a value of an Extents entry in a sub-partition description group for which a suffix of a Name entry and/or a suffix of a Group entry are/is _a in Slot0, to obtain the sub-partition address of the dynamic partition (Super).

When the device is started from the static partition B, Slot1 is read first when the Super partition is being loaded. When Slot1 is read, because the suffix _b corresponds to the static partition (B), the device reads a value of an Extents entry in a partition description group for which a suffix of a Name entry and/or a suffix of a Group entry are/is _b in Slot1, to obtain the sub-partition address of the dynamic partition (Super).

Generally, after system burning is performed before the device is delivered from a factory, in initial Slot0 and Slot1, there are two sub-partition description groups for each sub-partition of the Super partition, one sub-partition description group corresponds to the static partition (A), and the other sub-partition description group corresponds to the static partition (B). When reading Slot0 or Slot1, the device selects, based on the suffix (_a or _b), a sub-partition description group that needs to be read.

In other words, in Slot0 or Slot1, there are two sub-partition description groups (for example, the first description group and the second description group) for each sub-partition in the Super partition. Values of Name entries and Group entries of two sub-partition description groups for a same sub-partition have a same prefix and different suffixes (_a and _b respectively). Values of address entries for the two sub-partition description groups for the same sub-partition may be different.

FIG. 4 shows some data stored in the initial Slot0 in an embodiment. As shown in FIG. 4, in a sub-partition description group for which suffixes of a value of a Name entry and a value of a Group entry are _a, a value of an Extents entry is a real address of a sub-partition. In a partition description group for which suffixes of a value of a Name entry and a value of a Group entry are _b, a value of an Extents entry is set to null. When the device is started from the static partition A, Slot0 is read first when the Super partition is being loaded. When Slot0 is read, because the suffix _a corresponds to the static partition (A), the device reads a value of an Extents entry in a partition description group for which a suffix of a Name entry and/or a suffix of a Group entry are/is _a in Slot0, to obtain the sub-partition address of the Super partition, so that the Super partition is successfully loaded.

When Slot0 is read, because the suffix _b corresponds to the static partition (B), the device does not need to read a sub-partition description group for which a suffix of a Name entry and/or a suffix of a Group entry are/is _b in Slot0. Therefore, in a sub-partition description group for which a suffix of a Name entry and a suffix of a Group entry are _b, if a value of an Extents entry is set to null, loading of the Super partition is not affected.

Further, in some embodiments, data stored in the initial Slot1 is similar to a data structure shown in FIG. 4, and a difference lies in that, to ensure successful loading of the Super partition, in the data of Slot1, in a sub-partition description group for which a suffix of a Name entry and a suffix of a Group entry are _b, a value of an Extents entry is a real address of a sub-partition. In a sub-partition description group for which a suffix of a Name entry and a suffix of a Group entry are _a, a value of an Extents entry is set to null.

It can be learned that when the system is upgraded, the device needs to update the sub-partition description group in slot0 or slot1 in a timely manner. In this way, the device can read a correct sub-partition description, such as the Extents entry, only when the static partition used for starting is switched subsequently, to successfully load the dynamic partition (Super).

In addition, when the dynamic partition (Super) is loaded (for example, in S241), a cow file needs to be read from the virtual dynamic partition of the user data partition (Userdata). To accurately read the cow file from the user data partition (Userdata), the device may also create an index of the cow file in the basic partition (Common). The index of the cow file is used to instruct the device to read the cow file from the user data partition (Userdata). Then, when loading the dynamic partition (Super), the device may read the corresponding cow file from the user data partition (Userdata) based on the index.

A procedure of the virtual A/B upgrade solution is described below based on FIG. 3 with reference to update of slot1 and creation of the index of the cow file. Specifically, when the device is currently started from the static partition (A), the device upgrades an operating system based on a procedure shown in FIG. 5A(1) and FIG. 5A(2).

S200: The device sequentially loads a basic partition (Common), a static partition (A), and a dynamic partition (Super), and is started from the static partition (A).

S210: The device obtains an operating system upgrade installation package.

S510: The device parses the operating system upgrade installation package to obtain application manifest data (manifest).

In the operating system upgrade installation package, partition information (referred to as static partition information) of a static partition and partition information (referred to as dynamic partition information) of a dynamic partition in a data storage structure of an updated operating system (for example, a version 1.2) are recorded in the manifest. The static partition information includes a name and a size of each sub-partition in the static partition, a check value (for example, a hash value) of upgraded data, and a location of upgrade data (differential or full-scale mirror data) in the operating system upgrade installation package. The dynamic partition information includes a name and a size of each sub-partition in the dynamic partition, a check value (for example, a hash value) of upgraded data, and a location of upgrade data (differential or full-scale mirror data) in the operating system upgrade installation package.

For example, the dynamic partition of the updated operating system includes the following six sub-partitions: system, system_ext, vendor, product, cust, and odm. Correspondingly, the manifest includes the following dynamic partition information:

- a name and a size of the system partition, a check value (for example, a hash value) of upgraded data, and a location of upgrade data in the operating system upgrade installation package;
- a name and a size of the system_ext partition, a check value (for example, a hash value) of upgraded data, and a location of upgrade data in the operating system upgrade installation package;
- a name and a size of the vendor partition, a check value (for example, a hash value) of upgraded data, and a location of upgrade data in the operating system upgrade installation package;
- a name and a size of the product partition, a check value (for example, a hash value) of upgraded data, and a location of upgrade data in the operating system upgrade installation package;
- a name and a size of the cust partition, a check value (for example, a hash value) of upgraded data, and a location of upgrade data in the operating system upgrade installation package; and
- a name and a size of the odm partition, a check value (for example, a hash value) of upgraded data, and a location of upgrade data in the operating system upgrade installation package.

Further, if sub-partitions included in the dynamic partition in the data storage structure of the updated operating system are less than those in a current operating system, sub-partitions involved in the dynamic partition information in the manifest do not include all sub-partitions in a dynamic partition in the current operating system.

For example, in a data storage structure of the current operating system, a dynamic partition (Super) includes a total of six sub-partitions: system, system_ext, vendor, product, cust, and odm, and in a data storage structure of an upgraded operating system, a dynamic partition (Super) includes a total of four sub-partitions: system, product, cust, and odm. Correspondingly, the manifest includes the following dynamic partition information:

- a name and a size of the system partition, a check value (for example, a hash value) of upgraded data, and a location of upgrade data in the operating system upgrade installation package;
- a name and a size of the product partition, a check value (for example, a hash value) of upgraded data, and a location of upgrade data in the operating system upgrade installation package;
- a name and a size of the cust partition, a check value (for example, a hash value) of upgraded data, and a location of upgrade data in the operating system upgrade installation package; and
- a name and a size of the odm partition, a check value (for example, a hash value) of upgraded data, and a location of upgrade data in the operating system upgrade installation package.

It is obvious that the dynamic partition information included in the manifest does not involve the system_ext partition or the vendor partition.

S520: The device adjusts a sub-partition description group in slot1 in the dynamic partition (Super) based on the dynamic partition information in the manifest, to obtain the adjusted slot1. Sub-partitions involved in a sub-partition description group in the adjusted slot1 are in a one-to-one correspondence with sub-partitions involved in the dynamic partition information in the manifest.

Specifically, the device adjusts an address (Extents) entry of a corresponding sub-partition in slot1 based on a name and a size of a sub-partition, so that an adjusted address (Extents) entry of each sub-partition in slot1 matches a size of the corresponding sub-partition. In addition, the device deletes a sub-partition description group of a sub-partition that is not involved in the dynamic partition information of the manifest from slot1. In other words, sub-partitions involved in a sub-partition description group in updated slot1 are in a one-to-one correspondence with the sub-partitions involved in the dynamic partition information in the manifest.

A partition size of each sub-partition remains unchanged. In addition, for example, unadjusted slot1 is initial slot shown in (a) in FIG. 5B. The initial slot1 includes sub-partition description groups of a total of six sub-partitions: system, system_ext, product, vendor, cust, and odm. Each sub-partition includes two sub-partition description groups, one sub-partition description group corresponds to the static partition (A), and the other sub-partition description group corresponds to the static partition (B). The manifest obtained through parsing from the operating system upgrade package this time includes dynamic partition information of a total of four sub-partitions: system, product, cust, and odm. After adjustment, slot1 shown in (b) in FIG. 5B may be obtained. Compared with the unadjusted slot1, sub-partition description groups of the system_ext partition and the vendor partition are deleted from the adjusted slot1, and the adjusted slot1 includes only sub-partition description groups of a total of four sub-partitions: system, product, cust, and odm.

Figure 5:
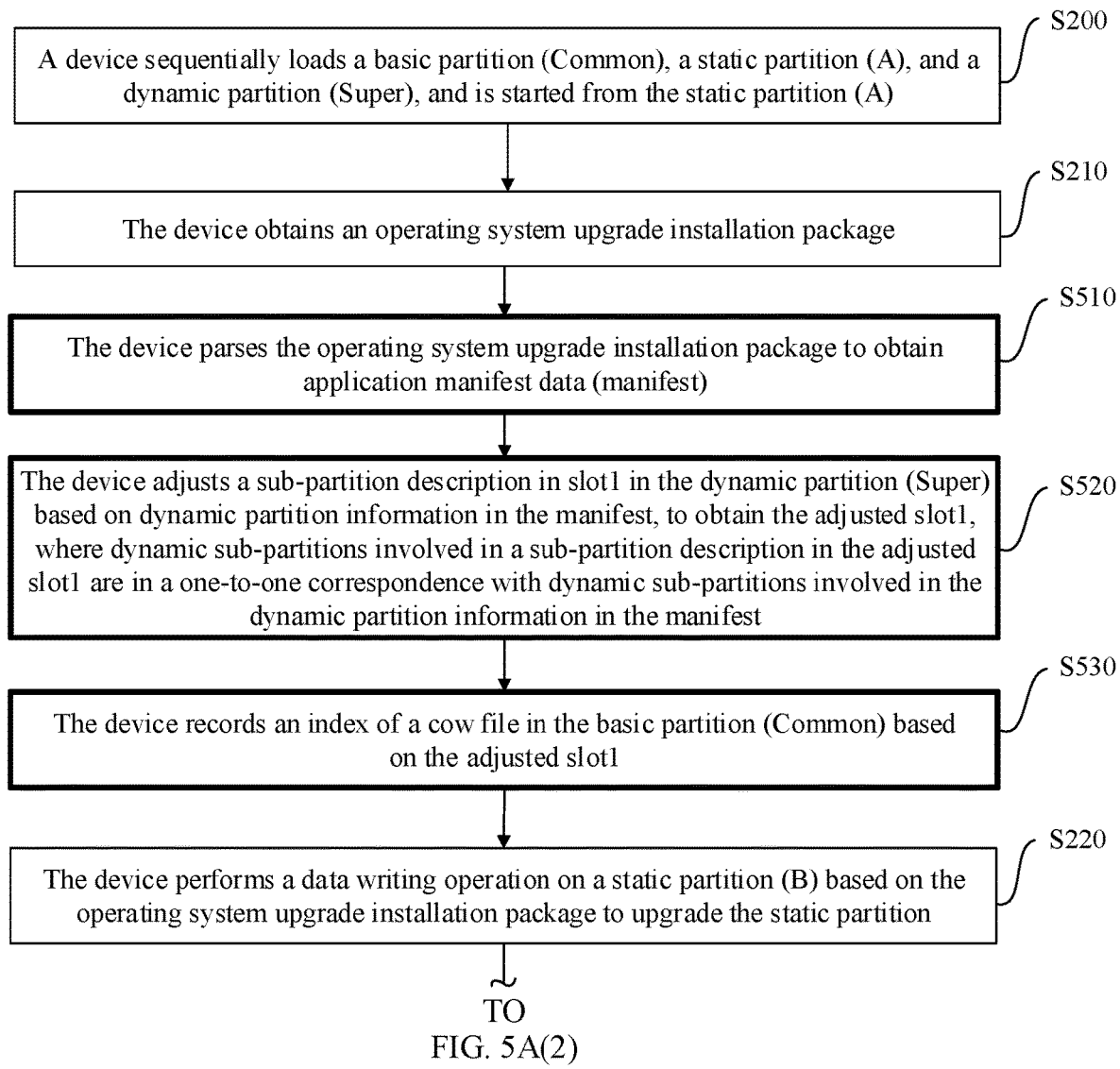
FIG. 5A(1) and FIG. 5A(2) are a flowchart of upgrade of an operating system according to an embodiment of this application.
FIG. 5B is a schematic diagram of adjusting slot data according to an embodiment of this application.

Further, if the unadjusted slot1 is the initial slot1 (as shown in (a) in FIG. 5B), compared with the unadjusted slot1, the adjusted slot1 retains only a sub-partition description group corresponding to the static partition (B), that is, a sub-partition description group whose suffix is _b, and a sub-partition description group corresponding to the static partition (A) is deleted, that is, a sub-partition description group whose suffix is _a.

S530: The device records an index of a cow file in the basic partition (Common) based on the adjusted slot1.

The index of the cow file may instruct the device to search a user data partition (Userdata) for the corresponding cow file, to load the dynamic partition (Super).

The device makes a copy of the sub-partition description group in the updated slot1 to the basic partition (Common), for example, in a file /gsi/ota/lp_metadata in metadata (/metadata) of the basic partition (Common), to obtain the index of the cow file.

For example, the adjusted slot1 shown in (b) in FIG. 5B is still used as an example. The sub-partition description group in the adjusted slot1 is copied into a file /metadate/gsi/ota/lp_metadata in the basic partition (Common), and in this case, indexes of cow files corresponding to a total of four sub-partitions: system, product, cust, and odm may be recorded in the file /metadate/gsi/ota/lp_metadata. For example, the indexes of the cow files in /metadate/gsi/ota/lp_metadata are as follows:

Name: system_b
Group: ry_dynamic_partitions_b
Attributes: readonly
Extents:
0 . . . 6995967 linear super 2048
. . .

Name: product_b
Group: ry_dynamic_partitions_b
Attributes: readonly
Extents:
0 . . . 65535 linear super 6998016
. . .
Name: odm_b
Group: ry_dynamic_partitions_b
Attributes: readonly
Extents:
0 . . . 1949695 linear super 9431040
. . .
Name: cust_b
Group: ry_dynamic_partitions_b
Attributes: readonly
Extents:
0 . . . 180223 linear super 16263168

S220: The device performs a data writing operation on a static partition (B) based on the operating system upgrade installation package to upgrade the static partition (B).

S540: The device creates a virtual dynamic partition in the user data partition (Userdata) based on the operating system upgrade installation package, and stores, in the virtual dynamic partition, upgrade data of the dynamic partition (Super) by using the cow file.

In the virtual dynamic partition, one cow file stores upgrade data of one sub-partition. For example, a file system_b_cow_img.img.000 stores upgrade data of the system partition and a file cust_b_cow_img.img.000 stores upgrade data of the cust partition.

S231: Change a device startup sequence from being started from the static partition (A) to being started from the static partition (B).

S232: The device is restarted.

S240: The device sequentially loads the basic partition (Common) and the static partition (B), and is started from the static partition (B).

S550: The device loads cow files in the dynamic partition (Super) and the virtual dynamic partition in the user data partition (Userdata) based on the adjusted slot1 and the index of the cow file.

When loading the dynamic partition (Super), the device may read the sub-partition description group from the adjusted slot1, and read the index of the cow file and merging status information. The device reads the sub-partition description group, and may obtain an address (Extents) entry of each sub-partition, that is, an offset address of each sub-partition in the dynamic partition. The device reads the merging status information, and may determine whether a cow file corresponding to each sub-partition needs to be retrieved from the user data partition (Userdata). Specifically, when it is learned through reading that an overall identifier of the merging status information is "merged", it is determined that cow files corresponding to all sub-partitions do not need to be retrieved from the user data partition (Userdata). When it is learned through reading that the overall identifier of the merging status information is "wait for merge", a sub-partition identifier for each sub-partition in the merging status information may be further read. If the sub-partition identifier is "merged", it is determined that a cow file corresponding to a corresponding sub-partition does not need to be retrieved from the user data partition (Userdata). If the sub-partition identifier is "wait for merge", it is determined that a cow file corresponding to a corresponding sub-partition needs to be retrieved from the user data partition (Userdata). The device reads the index of the cow file, and may retrieve the corresponding cow file from the user data partition (Userdata) based on a file name indicated by the index of the cow file.

For example, the device reads the merging status information, and determines that a cow file corresponding to the system sub-partition needs to be retrieved. Then, the device reads an index of a cow file including the following content:
Name: system_b,
Group: ry_dynamic_partitions_b,
Attributes: readonly,
Extents: 0 . . . 6995967 linear super 2048, A name entry "system_b" corresponding to the system sub-partition can be read. Then, the device may determine, based on a naming rule of the cow file, that a file name of a cow file corresponding to the name entry "system_b" is system_b_cow_img. The device may retrieve the cow file named system_b_cow_img from the user data partition (Userdata). Therefore, a cow file corresponding to the system partition is retrieved.

Then, the device may merge and load the dynamic partition (Super) and the cow file by using a snapshot.

For a part that is not described in detail in S550, for example, content of merging and loading the dynamic partition (Super) and the cow file by using the snapshot, refer to related descriptions of S241 in the embodiment shown in FIG. 2. Details are not described herein again.

S250: The device is successfully started and enters a user interaction interface.

S251: The device merges the data in the virtual dynamic partition into the dynamic partition (Super).

It should be noted herein that for steps that are not described in detail in FIG. 5A(1) and FIG. 5A(2), refer to descriptions of related steps in the embodiment shown in FIG. 2. Details are not described in the embodiment shown in FIG. 5A(1) and FIG. 5A(2). For example, for content of merging and loading the dynamic partition (Super) and the cow file by using the snapshot in S550, refer to related descriptions of S241 in the embodiment shown in FIG. 2.

In the upgrade solution shown in FIG. 5A(1) and FIG. 5A(2), after obtaining the operating system upgrade installation package, the device may adjust slot1 of the dynamic partition (Super) and create the index of the cow file. Then, the device may obtain, through loading by using the adjusted slot1 and the index of the cow file, data required for starting the dynamic partition (Super), to successfully start the dynamic partition (Super).

However, in an actual scenario, it is very likely that only some partitions in the entire operating system need to be upgraded. In this upgrade scenario, there are some deficiencies if the upgrade solution shown in FIG. 5A(1) and FIG. 5A(2) is used. A customized operating system is used as an example below to describe a requirement for upgrading some partitions and deficiencies of using the upgrade solution shown in FIG. 5A(1) and FIG. 5A(2) for this requirement.

A basic operating system (for example, systems corresponding to the data storage structures shown in FIG. 1 and FIG. 3) includes only the most basic functions, and cannot fully meet an application requirement of a user. Therefore, to improve user experience, a device supplier optimizes the basic operating system based on different customer requirements and application scenarios, and adds customized content to the basic operating system, to construct a customized operating system. The customized operating system is installed on a device, so that the device can provide an optimized system function.

Figure 6:
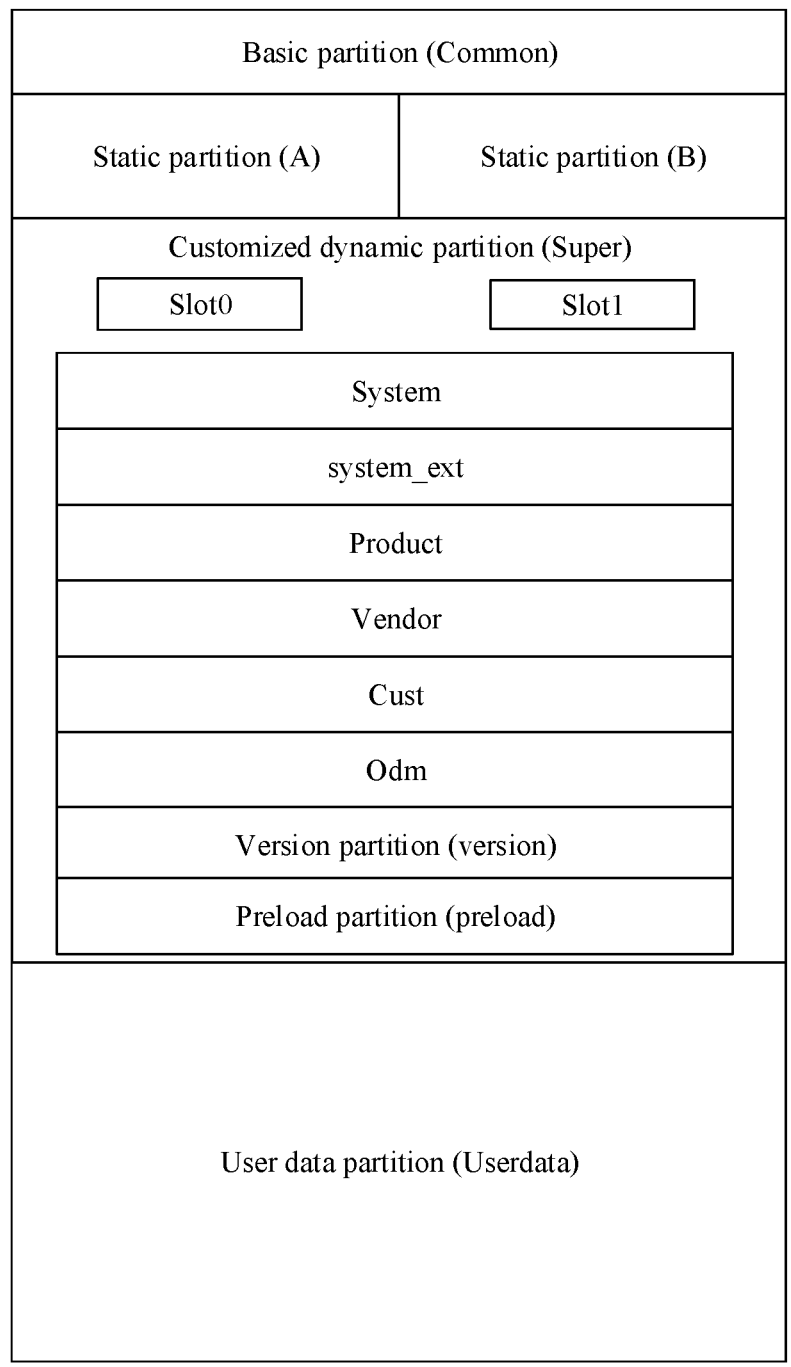
FIG. 6 is a schematic diagram of a data storage structure according to an embodiment of this application.

FIG. 6 is a schematic diagram of a data storage structure according to an embodiment of this application. As shown in FIG. 6, a data storage area of an Android system includes a basic partition (Common), a static partition (A), a static partition (B), a customized dynamic partition (Super), and a user data partition (Userdata). For specific sub-partitions included in the static partition (A) and the static partition (B), refer to related descriptions of the foregoing embodiment. The customized dynamic partition (Super) includes not only all sub-partitions in the dynamic partition (Super) in the data storage structure of the basic operating system shown in FIG. 1 and FIG. 3. In addition, customized data is added to the customized dynamic partition (Super) in a form of a sub-partition in the dynamic partition. As shown in FIG. 6, the customized dynamic partition (Super) further includes a version (version) partition and a preload (preload) partition. The Version partition and the preload partition are used to store the customized data.

For example, the version partition may be used to store customized data related to an operator (for example, China Mobile or China Unicom). The preload partition may be used to store related data of a three-party application pre-installed upon delivery of the device. It should be noted herein that in the embodiment shown in FIG. 6, the customized data is stored in the version partition and the preload partition. In another embodiment of this application, the customized data may alternatively be stored in another partition structure. For example, only the version partition or only the preload partition is reserved. For another example, an additional service partition is added.

Figure 7:
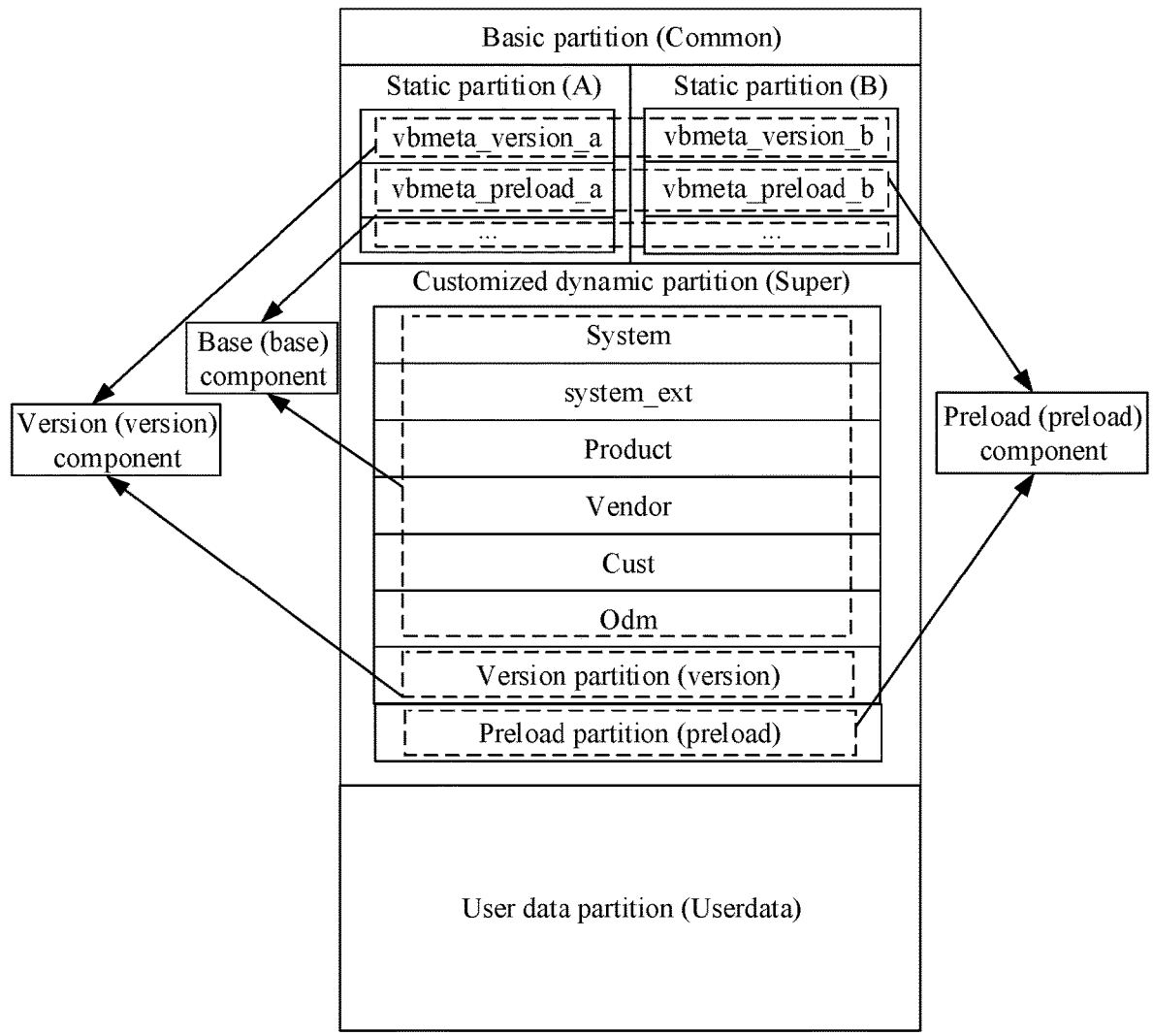
FIG. 7 is a schematic diagram of component classification in a data storage structure according to an embodiment of this application.

In the foregoing customized operating system, to meet an increasing customization requirement of a user, the customized data may need to be frequently upgraded. In addition, to facilitate management of the customized operating system, a data storage structure of the customized operating system may be divided into a plurality of components. FIG. 7 is a schematic diagram of a data storage structure according to an embodiment of this application. As shown in FIG. 7, the version partition in the customized dynamic partition and a partition (for example, a vbmeta_version partition) that is in the static partition and that is used to store check content of the version partition may be collectively referred to as a version (version) component, the preload partition in the customized dynamic partition and a partition (for example, a vbmeta_preload partition) that is in the static partition and that is used to store check content of the preload partition may be collectively referred to as a preload (preload) component, and all sub-partitions in a dynamic partition in a data storage structure of a basic operating system in the customized dynamic partition, such as system, system_ext, product, and vendor partitions, and a remaining part in the static partition are collectively referred to as a base (base) component. It should be noted herein that in the embodiment shown in FIG. 7, component classification is merely an example. In actual implementation, classification may be flexibly performed based on relevance of each partition. For example, each partition in the customized dynamic partition and space that is in the static partition and that is used to check the partition are classified as one component. The solution in this application is described below mainly by using the base component, the version component, and the preload component that are obtained through classification in FIG. 7 as an example.

Through classification of components, partitions with strong relevance, such as partitions with similar functions of stored data, may be classified as a same component. In addition, when data of any component is updated, an upgrading requirement is generated. In particular, the preload component has an extremely large upgrading requirement.

The version partition and the preload partition are sub-partitions in the customized dynamic partition (Super). Therefore, the entire customized operating system (basic data+customized data) may alternatively be upgraded by using the upgrade solution shown in FIG. 5A(1) and FIG. 5A(2). As shown in (a) in FIG. 8, when at least two components (for example, the version component and the preload component) have an upgrading requirement, a new version of a component (for example, the version component or the preload component) that needs to be upgraded and a current version of a component (for example, the base component) that does not need to be upgraded may be combined into a new version, and then the new version released, that is, a combined upgrade package is released. Then, after obtaining the combined upgrade package, the device may be upgraded by using the upgrade procedure shown in FIG. 5A(1) and FIG. 5A(2). In this upgrading manner, when any quantity of components need to be upgraded, a system upgrade package of a high version needs to be obtained through combination before upgrading. In this way, as an upgrading requirement of each component increases, a large quantity of upgrade packages of a high version are obtained, and this is not conducive to flexible management.

Figure 8:
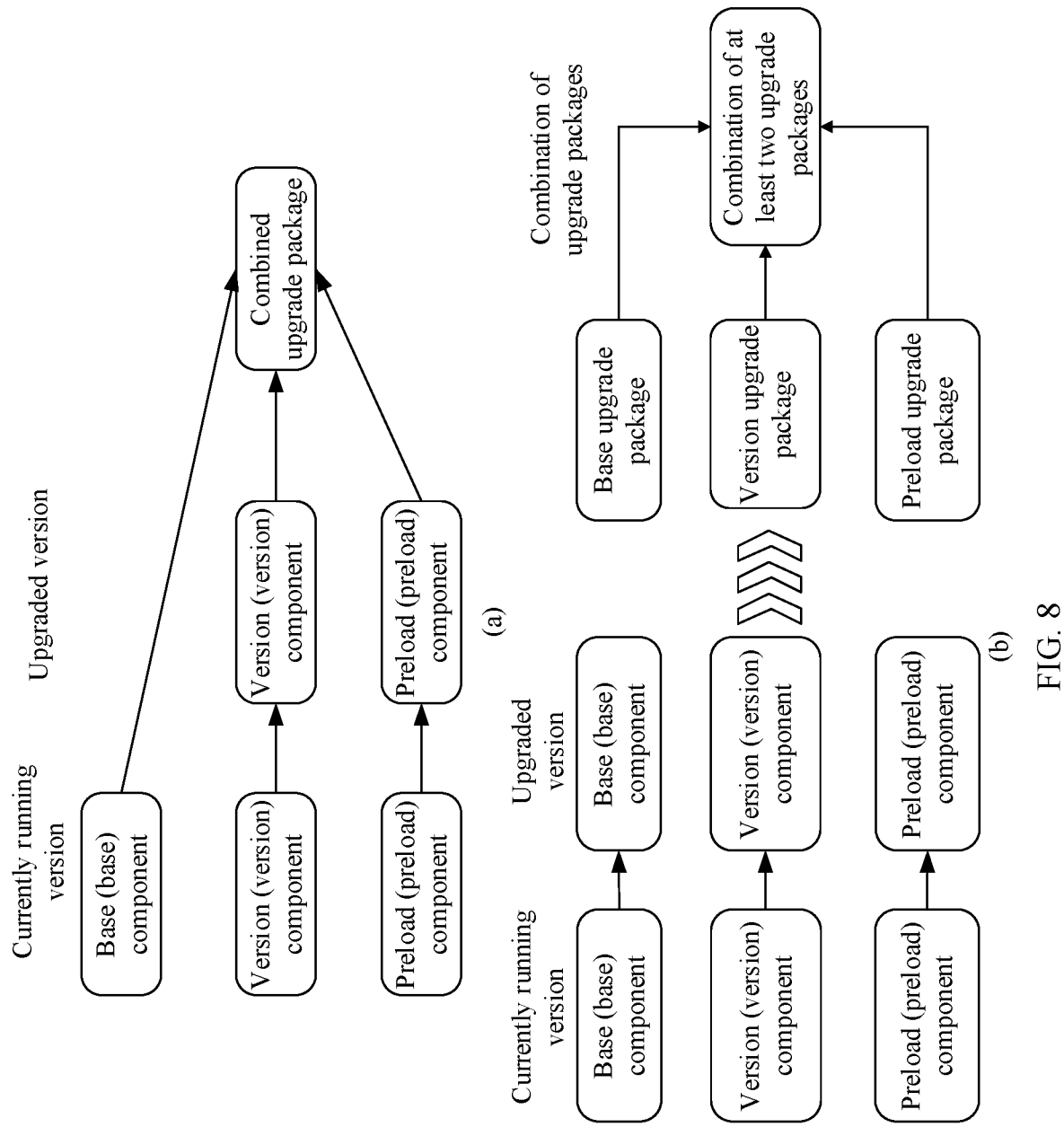
FIG. 8 is a schematic diagram of independent upgrade of a component according to an embodiment of this application.

If the foregoing manner of releasing upgrade of the combined upgrade package is not used, as shown in (b) in FIG. 8, when the base component needs to be upgraded, an upgrade installation package (also referred to as a base installation package) of the base component may be released; when the version component needs to be upgraded, an upgrade installation package (also referred to as a version upgrade package) of the version component may be released; and when the preload component needs to be upgraded, an upgrade installation package (also referred to as a preload upgrade package) of the preload component may be released. In other words, a version of each component may evolve independently. When a plurality of components need to be upgraded, upgrade installation packages corresponding to the plurality of components may be released. Then, if the upgrade procedure shown in FIG. 5A(1) and FIG. 5A(2) is used for upgrading, the device may adjust slot1 and create the index of the cow file only for manifest that is obtained through parsing from one of the upgrade installation packages. In this way, adjustment for slot1 is incomplete, and the created index of the cow file is inaccurate, and loading of the customized dynamic partition (Super) is finally affected.

Based on the foregoing problem, this application provides a method for upgrading a plurality of components in an operating system in combination. In this method, at least two components in the operating system (a basic operating system or a customized operating system) may be upgraded and updated in combination, so that various upgrading requirements can be flexibly adapted, for example, a requirement for upgrading the base component and the version component in combination, and a requirement for upgrading the version component and the preload component in combination. Specifically, when the device is currently started from the static partition (A), the device upgrades a plurality of components in combination based on a procedure shown in FIG. 9A and FIG. 9B.

S900: The device sequentially loads a basic partition (Common), a static partition (A), and a dynamic partition (Super), and is started from the static partition (A).

When the device is started from the static partition (A), a plurality of sub-partition description groups in Slot0 are read to load data in the dynamic partition. In this case, an unupgraded operating system is run, and the operating system may also be referred to as a first operating system.

Figure 9A:
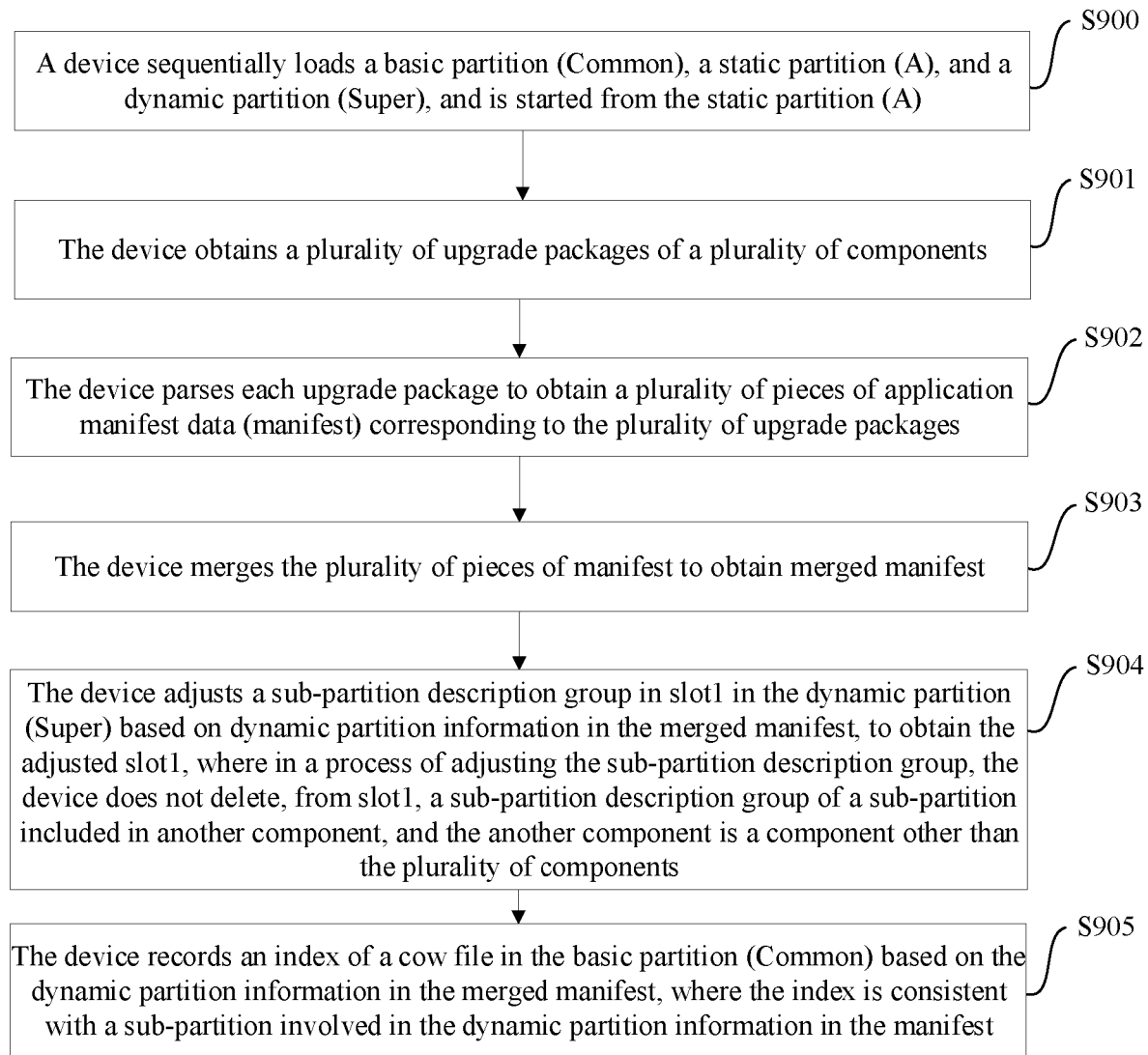

It should be understood that when the embodiment in FIG. 9A and FIG. 9B is applied to upgrade of a basic operating system, the dynamic partition (Super) is a dynamic partition (Super) in the basic operating system. When the embodiment in FIG. 9A and FIG. 9B is applied to upgrade of a customized operating system, the dynamic partition (Super) is a customized dynamic partition (Super) in the customized operating system. This is the same in the following descriptions, and details are not described again.

S901: The device obtains a plurality of upgrade packages of a plurality of components.

In this embodiment of this application, the plurality of upgrade packages include one of the following: a combination of a base upgrade package and a version upgrade package, a combination of a base upgrade package and a preload upgrade package, a combination of a version upgrade package and a preload upgrade package, and a combination of a base upgrade package, a version upgrade package, and a preload upgrade package. When the plurality of components have upgrading requirements, the device may download the plurality of upgrade packages of the plurality of components at a time, and then, collectively upgrade the plurality of components for the plurality of upgrade packages.

In addition, each upgrade package may be used to upgrade a dynamic sub-partition (that is, a sub-partition in the dynamic partition) and/or a static sub-partition (that is, a sub-partition in the static partition) that are involved in a corresponding component. It should be understood that one or more dynamic sub-partitions and one or more static sub-partitions may be involved in each component. For example, the plurality of components include a version component. If a dynamic sub-partition involved in the version component is a version partition and an involved static sub-partition is a vbmeta_version partition, the version upgrade package may be used to upgrade the version partition and the vbmeta_version partition.

For convenience of description, an upgrade package of one component may be referred to as one upgrade installation package. When there are the plurality of upgrade packages of the plurality of components, prefixes first, second, . . . may be used for differentiation. The combination of the base upgrade package and the version upgrade package is used as an example. The base upgrade package may be referred to as a first upgrade installation package, and the version upgrade package is referred to as a second upgrade installation package. In addition, for ease of description, a dynamic sub-partition to be upgraded by using the first upgrade installation package may be referred to as a first sub-partition, a dynamic sub-partition to be upgraded by using the second upgrade installation package is referred to as a second sub-partition, and a sub-partition other than dynamic sub-partitions to be upgraded by using the plurality of upgrade packages is referred to as a third sub-partition. A static sub-partition to be upgraded by using the first upgrade installation package may be referred to as a fifth sub-partition, a dynamic sub-partition to be upgraded by using the second upgrade installation package is referred to as a sixth sub-partition, and a sub-partition other than static sub-partitions to be upgraded by using the plurality of upgrade packages is referred to as a seventh sub-partition. It should be understood that, in actual implementation, based on classification of components in the data storage structure, there may also be a third upgrade installation package, a fourth upgrade installation package, and the like. For these upgrade installation packages, other dynamic sub-partitions and static sub-partitions may be upgraded. For example, the third upgrade package may be used to upgrade a fourth sub-partition in the dynamic partition. This is not specifically limited in this embodiment of this application.

In a feasible implementation solution, the device periodically initiates a packet search request to a packet search server, and the packet search request includes a version number of each component in an operating system that is currently run by the device. The packet search server retrieves, based on the version number of each component in the packet search request, whether there is currently an upgrade package of each component with an updated version number. For example, in the operating system that is currently run by the device, version numbers of a base component, a version component, and a preload component are all a version 1.1. If the packet search server learns, through retrieving, that a latest version number of the base component is still the version 1.1, but latest version numbers of the version component and the preload component are 1.2, it indicates that there are upgrade packages of the version component and the preload component with the updated version number. When there are upgrade packages of an updated version for a plurality of components, the packet search server feeds back downloading addresses of the upgrade packages of the plurality of components to the device. The device may download an upgrade package of a corresponding component based on the downloading address.

After the device downloads the upgrade packages of the plurality of components, in response to a system upgrading event, for example, the user inputs an upgrading operation, or predetermined upgrading time is reached, an online upgrade client (online update client, OUC) in the device may send a location of the upgrade package in the device to an update engine (update engine) of the device. Then, the update engine performs a specific upgrading operation, for example, a subsequent operation such as upgrade package parsing or data writing, to complete upgrading.

S902: The device parses each upgrade package to obtain a plurality of pieces of application manifest data (manifest) corresponding to the plurality of upgrade packages.

The device may read an offset location and a size of header data of payload.bin in each upgrade package from metadata (/metadata) of the upgrade package. Then, the device may obtain the manifest from the upgrade package based on the offset location and the size of the header data of payload.bin in the upgrade package.

For example, some content recorded in the metadata (/metadata) of the upgrade package is shown as follows:
files=payload_metadata.bin:720:1346, payload.bin:720: 285881, payload_properties.txt:286653:150, VERSION.mbn:286929:106, SOFTWARE_VER.mbn: 286849:21, metadata:63:61 6.

In the foregoing content, a meaning of payload_metadata.bin:720:1346 is the offset location (for example, 720 in units of bytes) and the size (for example, 1346 in units of bytes) of the header data (that is, the manifest) of payload.bin in the upgrade package. Then, the device may obtain original bare data of the manifest (that is, original data recorded in the upgrade package) based on the offset location and the size, and then invoke decoding on the original bare data to obtain specific content of the manifest.

In this embodiment of this application, static partition information included in manifest obtained through parsing from each upgrade package relates only to a sub-partition in a static partition included in the plurality of components, and dynamic partition information relates only to a sub-partition in a dynamic partition included in the plurality of components, and does not relate to another component. The another component is a component other than the plurality of components. The static partition information or the dynamic partition information (which may be referred to as partition information for short) includes a name (which may also be understood as a partition identifier) and a size of a sub-partition, a check value (for example, a hash value) of upgraded data, and a location of upgrade data in the upgrade package. For ease of description, a plurality of pieces of application manifest data obtained through parsing from the plurality of upgrade packages may be referred to as first data, second data, . . . . For example, application manifest data obtained through parsing from the first upgrade installation package is referred to as the first data, application manifest data obtained through parsing from the second upgrade installation package is referred to as the second data, . . . .

For example, the plurality of components include a version component. The version component includes a vbmeta_version partition in the static partition and a version partition in the dynamic partition. Therefore, correspondingly, manifest obtained through parsing may include the following partition information:

a name and a size of the vbmeta_version partition, check value (for example, a hash value) information of upgraded data, and a location of upgrade data in the version upgrade package; and a name and a size of the version partition, check value (for example, a hash value) information of upgraded data, and a location of upgrade data in the version upgrade package.

For another example, the plurality of components include a preload component. The preload component includes a vbmeta_preload partition in the static partition and a preload partition in the dynamic partition. Therefore, correspondingly, manifest obtained through parsing may include the following partition information:

a name and a size of the vbmeta_preload partition, check value (for example, a hash value) information of upgraded data, and a location of upgrade data in the preload upgrade package; and a name and a size of the preload partition, check value (for example, a hash value) information of upgraded data, and a location of upgrade data in the preload upgrade package.

For still another example, the plurality of components include a base component. The base component includes a partition other than vbmeta_version and vbmeta_preload in the static partition, for example, a partition such as boot or recovery, and a sub-partition included in the dynamic partition in the basic operating system, for example, a partition such as system or product. Therefore, correspondingly, manifest obtained through parsing may include the following partition information:

a name and a size of the boot partition, check value (for example, a hash value) information of upgraded data, and a location of upgrade data in an operating system upgrade package;

a name and a size of the recovery partition, check value (for example, a hash value) information of upgraded data, and a location of upgrade data in the operating system upgrade package;

. . . (partition information of another sub-partition in the static partition);

a name and a size of the system partition, check value (for example, a hash value) information of upgraded data, and a location of upgrade data in the operating system upgrade package;

a name and a size of a system_ext partition, check value (for example, a hash value) information of upgraded data, and a location of upgrade data in the operating system upgrade package;

a name and a size of a vendor partition, check value (for example, a hash value) information of upgraded data, and a location of upgrade data in the operating system upgrade package; and . . . (partition information of another sub-partition in the dynamic partition).

S903: The device merges the plurality of pieces of manifest to obtain merged manifest.

For ease of description, the merged manifest may be referred to as third data.

Figure 10A:
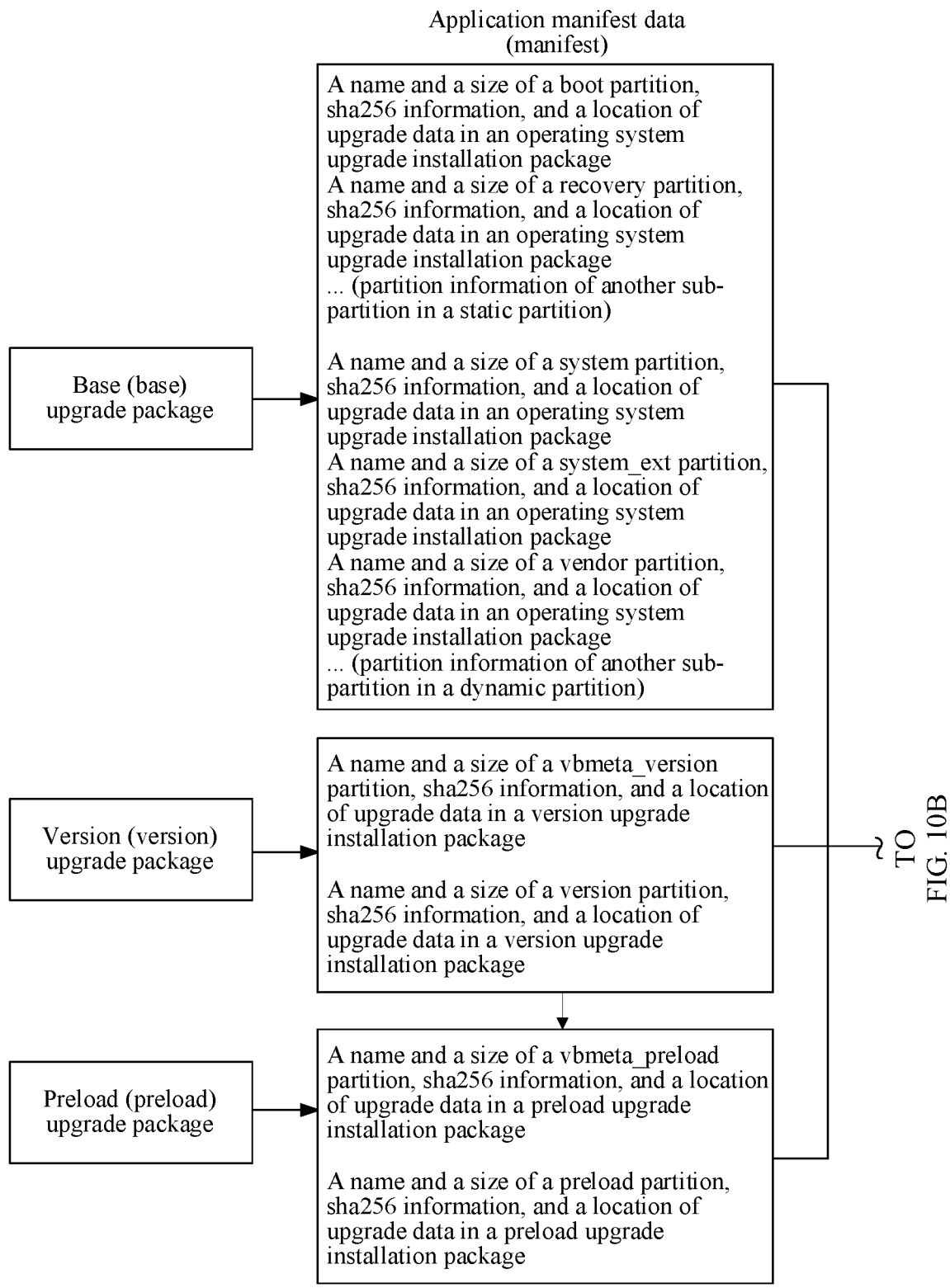
FIG. 10A and FIG. 10B are a schematic diagram of a process of merging manifest according to an embodiment of this application.
Figure 10B:
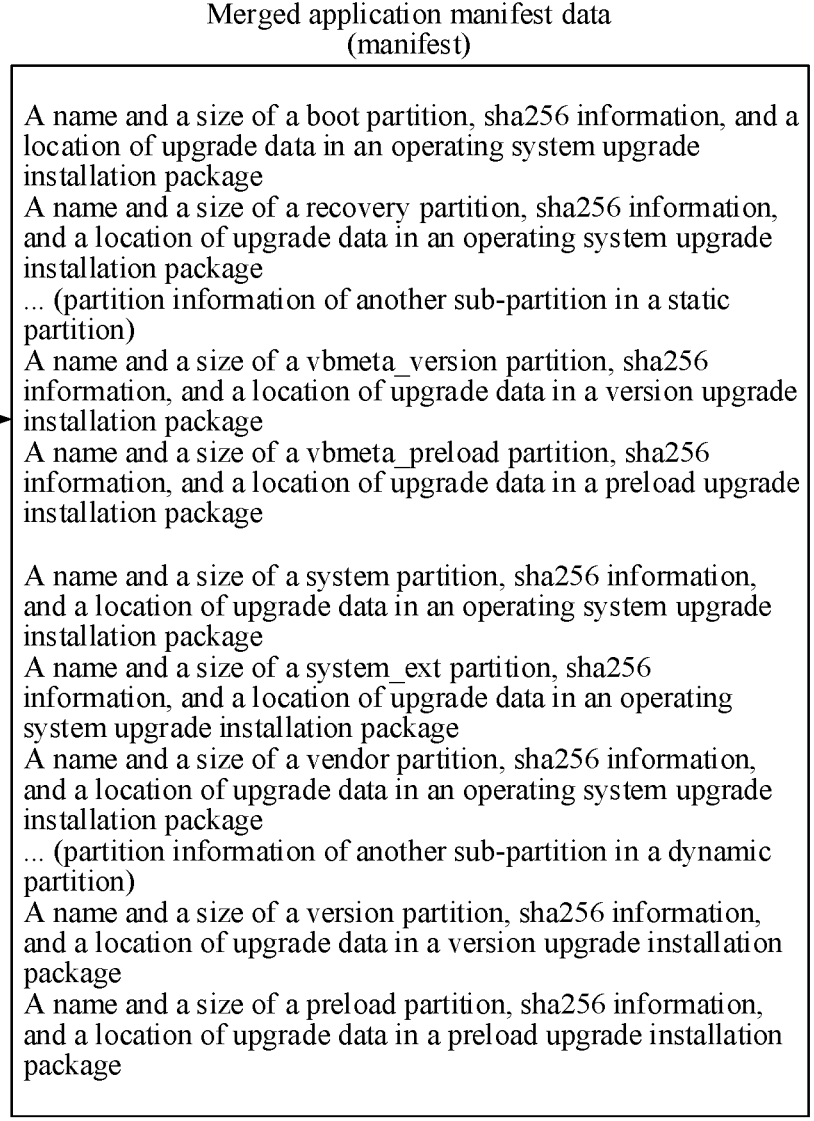

During merging processing, the device may concatenate the plurality of pieces of manifest in a head-to-tail manner in a first preset sequence. For example, the first preset sequence is manifest obtained through parsing from the base upgrade package, manifest obtained through parsing from the version upgrade package, and manifest obtained through parsing from the preload upgrade package from front to back. Alternatively, the device may separately concatenate static partition information and dynamic partition information in the plurality of pieces of manifest in the first preset sequence. For example, as shown in FIG. 10A and FIG. 10B, the plurality of upgrade packages include the base upgrade package, the version upgrade package, and the preload upgrade package. When merging three pieces of manifest obtained through parsing from the three upgrade packages, the device may sequentially concatenate static partition information in the manifest obtained through parsing from the base upgrade package, the manifest obtained through parsing from the version upgrade package, and the manifest obtained through parsing from the preload upgrade package, and sequentially concatenate dynamic partition information in the manifest obtained through parsing from the base upgrade package, the manifest obtained through parsing from the version upgrade package, and the manifest obtained through parsing from the preload upgrade package, to obtain concatenated manifest.

After S903, the device may obtain the merged manifest, and may place the merged manifest into a newly created object such as mergedmanifest. Subsequently, the device may complete corresponding processing only based on a value of mergedmanifest, for example, adjust slot1 and create an index of a cow file.

S904: The device adjusts a sub-partition description group in slot1 in the dynamic partition (Super) based on dynamic partition information in the merged manifest, to obtain the adjusted slot1. In a process of adjusting the sub-partition description group, the device does not delete, from slot1, a sub-partition description group of a sub-partition included in another component, and the another component is a component other than the plurality of components.

The merged manifest includes dynamic partition information of a sub-partition included in the plurality of components in the dynamic partition, and the dynamic partition information includes a name and a size of the sub-partition. In a process in which the device adjusts slot1 based on the merged manifest, the device adjusts an address (Extents) entry in a corresponding sub-partition description group in slot1 based on the name and the size of the sub-partition in the dynamic partition information. If the size of the sub-partition remains unchanged, the address (Extents) entry in the corresponding sub-partition description group in slot1 remains unchanged. If the size of the sub-partition changes, the address (Extents) entry in the corresponding sub-partition description group in slot1 is adjusted. Therefore, an address (Extents) entry of each sub-partition description group in the adjusted slot1 matches a size of a corresponding sub-partition. In the following embodiments, the solution of this application is mainly described by using an example in which the size of the sub-partition remains unchanged.

In addition, if the plurality of components are only two of the base component, the version component, and the preload component, it indicates that not all the components need to be upgraded. In this embodiment of this application, in the process in which the device adjusts slot1 based on the merged manifest, the sub-partition description group of the sub-partition included in the another component is not deleted from slot1, that is, a sub-partition description group of a sub-partition included in a component that does not need to be upgraded is deleted. For ease of description, a plurality of sub-partition description groups included in the adjusted slot1 may be referred to as a plurality of third description groups.

For example, the plurality of components are the version component and the preload component; in other words, only the version component and the preload component need to be upgraded, and the base component does not need to be upgraded. A sub-partition included in the version component is a version partition, and a sub-partition included in the preload component is a preload partition. In this case, the merged manifest includes dynamic partition information of the version partition and dynamic partition information of the preload partition. It is assumed that a size of each sub-partition in the dynamic partition remains unchanged before and after upgrade, and the unadjusted slot1 includes a sub-partition description group shown in (a) in FIG. 11; in other words, the unadjusted slot1 includes sub-partition description groups of a total of eight sub-partitions: system, system_ext, product, vendor, cust, odm, version, and preload. After adjusting slot1 based on the manifest, the device learns that the adjusted slot1 includes a sub-partition description group shown in (b) in FIG. 11. In comparison with slot1, a sub-partition description group of a partition other than the version partition and the preload partition is not deleted from the adjusted slot1. For example, the unadjusted slot1 includes sub-partition description groups of partitions (sub-partitions included in the base component) such as system, system_ext, and product, and the adjusted slot1 also includes the sub-partition description groups (as shown by a dashed-line frame in (b) in FIG. 11) of the partitions (sub-partitions included in the base component) such as system, system_ext, and product. In the foregoing example, that the size of each sub-partition remains unchanged is used as a precondition, and in this case, a corresponding sub-partition description group in the adjusted slot1 is the same as each sub-partition description group in the unadjusted slot1. However, in practice, if a size of at least one sub-partition (for example, the version partition) in the plurality of components is different before and after upgrade, an address (Extents) entry in a sub-partition description group of the at least one sub-partition in slot1 may correspondingly change.

In other words, in the process of adjusting slot1, a description group of a sub-partition (for example, the third sub-partition) that is not involved in the dynamic partition information in the merged manifest is not deleted.

It should be noted that if the unadjusted slot1 is initial slot1, in the process of adjusting slot1 based on the manifest, the device deletes a sub-partition description group corresponding to the static partition (A), that is, a sub-partition description group whose suffix is _a, and reserves only a sub-partition description group corresponding to the static partition (B), that is, a sub-partition description group whose suffix is _b.

S905: The device records an index of a cow file in the basic partition (Common) based on the dynamic partition information in the merged manifest. The index is consistent with a sub-partition involved in the dynamic partition information in the manifest.

For ease of description, the index of the cow file in S905 and subsequent steps may be referred to as a first index.

If the plurality of components are only two of the base component, the version component, and the preload component, it indicates that not all the components need to be upgraded. In this case, the adjusted slot1 not only includes sub-partition description groups corresponding to the plurality of components (that is, components that need to be upgraded), but also reserves a sub-partition description group corresponding to another component (that is, a component that does not need to be upgraded). If the device directly copies the adjusted slot1 to obtain the index of the cow file, when the dynamic partition (Super) is subsequently loaded, the index not only instructs the device to read cow files corresponding to sub-partitions included in the plurality of components (that is, the components that need to be upgraded) from the user data partition (Userdata), but also instructs the device to read a cow file corresponding to a sub-partition included in the another component (that is, the component that does not need to be upgraded) from the user data partition (Userdata). However, the another component does not need to be upgraded this time, and the device does not write the cow file corresponding to the sub-partition included in the another component into the user data partition (Userdata). Therefore, it is obviously unreasonable to instruct the device to read the cow file corresponding to the sub-partition included in the another component from the user data partition (Userdata).

Based on this, in this embodiment of this application, the device records the index of the cow file in the basic partition (Common) based on the dynamic partition information in the merged manifest. The index is consistent with a sub-partition involved in the dynamic partition information in the merged manifest. In this way, the index may only instruct the device to read, from the user data partition (Userdata), a cow file corresponding to a sub-partition included in the component that needs to be ungraded.

That the plurality of components are the version component and the preload component is still used as an example. The merged manifest includes dynamic partition information of the version partition and dynamic partition information of the preload partition. Correspondingly, the device may record only an index of a cow file of the version partition and an index of a cow file of the preload partition in the basic partition (Common) to instruct the device to read the cow file corresponding to the version partition and the cow file corresponding to the preload partition from the user data partition (Userdata).

In some embodiments, after obtaining the plurality of upgrade packages, the device may create a file /gsi/ota/lp_metadata in the metadata (/metadate) of the basic partition (Common), and record the index of the cow file in the file /gsi/ota/lp_metadata. Therefore, it is convenient for the device to obtain the index of the cow file from a fixed location.

In some embodiments, the index of the cow file includes a name of the cow file. For example, the device may generate, based on the sub-partition (for example, the first sub-partition or the second sub-partition) involved in the dynamic partition information included in the merged manifest and a naming rule of the cow file, a name of a cow file of the sub-partition involved in the dynamic partition information, and use the name as an index. For example, sub-partitions involved in the dynamic partition information are the version partition and the preload partition, and the device is currently started from the static partition (A), a name of a cow file of the version partition may be generated as version_b_cow_img, and a name of a cow file of the preload partition may be generated as preload_b_cow_img. A suffix _b corresponds to the static partition (B), and may be read when the device is restarted from the static partition (B), to load the dynamic partition. The device may write the name version_b_cow_img into the basic partition (Common) as an index of the cow file of the version partition. The device may write the name preload_b_cow_img into the basic partition (Common) as an index of the cow file of the preload partition. In this way, a cow file that needs to be found may be accurately indicated by using the name. For ease of description, a name of a cow file of the first sub-partition may be referred to as a first file name, and a name of a cow file of the second sub-partition may be referred to as a second file name.

In some embodiments, the index of the cow file further includes a storage location of the cow file. For example, the storage location may be the user data partition (Userdata). For another example, the storage location may be a target directory (for example, a directory /data/gsi/ota) of the user data partition (Userdata), and the target directory of the user data partition (Userdata) is used to store upgrade data. If the upgrade data is stored as the cow file, the cow file is also stored in the target directory. In this way, a location of the found cow file may be accurately indicated by using the storage location.

That the plurality of components are the version component and the preload component is still used as an example. The obtained index of the cow file may include the following information:

Content: version_b_cow_img and preload_b_cow_img;
Location: userdata.

The index indicates there are a cow file named version_b_cow_img and a cow file named preload_b_cow_img in the user data partition (Userdata).

It should be understood that S904 and S905 have no strict sequence. In actual implementation, S905 may also be performed before S904, or S904 and S905 may be performed simultaneously. This is not specifically limited in this embodiment of this application.

In this embodiment of this application, after the merged manifest is obtained, in one aspect, after S904, the device may adjust slot1 based on the merged manifest, and the adjusted slot1 still retains a sub-partition description group of a sub-partition included in a component that is not upgraded this time. In another aspect, after S905, the device may create the index of the cow file based on the merged manifest, so that the index of the cow file only instructs the device to read, from the user data partition (Userdata), a cow file corresponding to a sub-partition included in a component that needs to be upgraded this time.

S906: The device creates a virtual dynamic partition in the user data partition (Userdata) based on the plurality of upgrade packages, sequentially performs a data writing operation on a static partition (B) based on the plurality of upgrade packages to upgrade the static partition, and writes upgrade data of the dynamic partition (Super) into the virtual dynamic partition. In the virtual dynamic partition, the cow file is used to store the upgrade data of the dynamic partition (Super).

Each upgrade package includes upgrade data used to upgrade a dynamic sub-partition and upgrade data used to upgrade a static sub-partition. For ease of description, upgrade data that is in the first upgrade installation package and that is used to upgrade the dynamic sub-partition (for example, the first sub-partition) may be referred to as first upgrade data, and upgrade data that is in the second upgrade installation package and that is used to upgrade the dynamic sub-partition (for example, the second sub-partition) may be referred to as second upgrade data. In addition, upgrade data that is in the first upgrade installation package and that is used to upgrade the static sub-partition (for example, the fifth sub-partition) may be referred to as third upgrade data, and upgrade data that is in the second upgrade installation package and that is used to upgrade the static sub-partition (for example, the sixth sub-partition) is referred to as fourth upgrade data.

In this embodiment of this application, the device writes data in the plurality of upgrade packages that is used to upgrade the static sub-partition into a corresponding sub-partition (for example, the fifth sub-partition or the sixth sub-partition) of the static partition (B), and writes data in the plurality of upgrade packages that is used to upgrade the dynamic sub-partition into the virtual dynamic partition.

For example, the plurality of components are the version component and the preload component. The version component includes a vbmeta_version partition (a sub-partition belonging to the static partition) and a version partition (a sub-partition belonging to the dynamic partition), and the preload component includes a vbmeta_preload partition (a sub-partition belonging to the static partition) and a preload partition (a sub-partition belonging to the dynamic partition). Correspondingly, when updating data, the device writes data of the vbmeta_version partition in the version upgrade package and data of the vbmeta_preload partition in the preload upgrade package into a corresponding partition in the static partition (B). For example, the data of the vbmeta_version partition is written into a directory /dev/block/by-name/vbmeta_version_b, and the data of the vbmeta_preload partition is written into a directory /dev/block/by-name/vbmeta_preload_b, where a suffix _b in the directories corresponds to the static partition (B). In addition, the data of the version partition in the version upgrade package and the data of the preload partition in the preload upgrade package are written into the virtual dynamic partition as cow files. For example, the data of the version partition is written into a cow file named version_b_cow_img in the virtual dynamic partition, and the data of the preload partition is written into a cow file named preload_b_cow_img in the virtual dynamic partition. Similarly, a suffix _b in the file names corresponds to the static partition (B).

Further, because upgrade of the plurality of components is involved, when updating data, the device may sequentially write, into corresponding locations, data that is in each upgrade package and that is used to upgrade the static sub-partition and data that is used to upgrade the dynamic sub-partition. However, data cannot be updated only based on a writing operation performed on data of one upgrade package as in the upgrade solution shown in FIG. 5A(1) and FIG. 5A(2) (S220 and S540).

Specifically, when writing data into the static partition (B) and the virtual dynamic partition, the device may sequentially traverse the plurality of upgrade packages in a second preset sequence. For example, the second preset sequence is sequentially the base upgrade package, the version upgrade package, and the preload upgrade package from front to back. When each upgrade package is traversed, upgrade data is obtained from the upgrade package and written into a corresponding location, to complete data updating. If the data is upgrade data of the static partition, the upgrade data is written into the static partition (B). If the data is upgrade data of the dynamic partition, the upgrade data is written into the user data partition (Userdata) in a form of the cow file. After data corresponding to one upgrade package is written, it is determined whether there is still an upgrade package that needs to be updated. If yes, traversing continues. If no, S906 ends.

In a specific implementation, after obtaining the plurality of upgrade packages, the device may place the plurality of upgrade packages into a target array in the second preset sequence, and each upgrade package is one element of the target array. In S906, the device may sequentially fetch elements from the array. After an element is fetched, data writing for a corresponding upgrade package is completed. In addition, after data writing for each upgrade package is completed, the device may continue to fetch an element from the target array. If an element can be fetched, it is determined that there is an upgrade package that needs to be updated, and data writing continues. On the contrary, if no element can be fetched, it is determined that data of all upgrade packages is updated, and S906 ends.

For example, the plurality of components are the version component and the preload component, and the second preset sequence is sequentially the base upgrade package, the version upgrade package, and the preload upgrade package from front to back. Because the plurality of components do not include the base component, the device may sequentially place only the version upgrade package and the preload upgrade package into the target array. In S906, the device may fetch the version upgrade package from the target array in the first time, write data of the vbmeta_version partition in the version upgrade package into the vbmeta_version partition in the static partition (B), and write data of the version partition in the version upgrade package into the virtual dynamic partition as the cow file, to update data for the version upgrade package. Then, the device may fetch the preload upgrade package from the target array in the second time, write data of the vbmeta_preload partition in the preload upgrade package into the vbmeta_preload partition in the static partition (B), and write data of the preload partition in the preload upgrade package into the virtual dynamic partition as the cow file, to update data for the preload upgrade package. In this case, all upgrade packages in the target array have been fetched, and the device cannot fetch any upgrade package from the target array. Therefore, it can be determined that all the upgrade packages are updated, and S906 ends.

Further, after data update is completed in S906, the device checks updated data of each sub-partition. In this embodiment of this application, the device may complete checking based on the merged manifest.

For each sub-partition in the static partition, the device may calculate a check value (for example, a hash value) of upgraded data in the sub-partition in the operating system, and then compare the check value with a target check value (for example, a hash value) of a corresponding sub-partition in the merged manifest. If the two values are the same, the checking succeeds. The vbmeta_version partition is used as an example. After writing data into the vbmeta_version partition, the device may calculate a sha256 value of the data in the directory /dev/block/by-name/vbmeta_version_b, and compare the sha256 value with a sha256 value of the vbmeta_version partition in the merged manifest. If the two values are the same, the checking succeeds.

For each sub-partition in the dynamic partition, the device may calculate a check value (for example, a hash value) of a synthesis result of data of the sub-partition and data in a cow file of the sub-partition in the virtual dynamic partition, and then compare the hash value with a target check value (for example, a hash value) of a corresponding sub-partition in the merged manifest. If the two values are the same, the checking succeeds. The version partition is used as an example. After writing the upgrade data of the version partition into a cow file named version_b_cow_img into the virtual dynamic partition, the device may calculate a sha256 value of a synthesis result of data of the version partition in the dynamic partition and data in the cow file named version_b_cow_img in the virtual dynamic partition, and compare the sha256 value with a sha256 value of the version partition in the merged manifest. If the two values are the same, the checking succeeds.

S907: Change a device startup sequence from being started from the static partition (A) to being started from the static partition (B).

S908: The device is restarted.

S909: The device sequentially loads the basic partition (Common) and the static partition (B), and is started from the static partition (B).

In this case, an upgraded operating system is started from the static partition (B), and the operating system may also be referred to as a second operating system.

S910: The device loads cow files in the dynamic partition (Super) and the virtual dynamic partition in the user data partition (Userdata) based on the adjusted slot1 and the index of the cow file.

In this embodiment of this application, the adjusted slot1 includes sub-partition description groups corresponding to the base component, the version component, and the preload component. Therefore, when reading the sub-partition description group in the adjusted slot1, the device may obtain address (Extents) entries of all sub-partitions in the dynamic partition. In addition, the index of the cow file includes only indexes of cow files corresponding to sub-partitions included in the plurality of components (that is, components that need to be upgraded this time). Therefore, by reading the index of the cow file, the device may obtain only cow files corresponding to all upgraded sub-partitions in the dynamic partition, that is, the first upgrade data and the second upgrade data.

S911: The device is successfully started and enters a user interaction interface.

S912: The device merges the data in the virtual dynamic partition into the dynamic partition (Super).

In addition, for a part that is not described in detail in the embodiment shown in FIG. 9A and FIG. 9B, refer to the foregoing descriptions of the embodiment shown in FIG. 5A(1) and FIG. 5A(2). Details are not described herein again.

In the solution in the embodiment shown in FIG. 9A and FIG. 9B, after obtaining the upgrade packages of the plurality of components, the device may process the plurality of upgrade packages to upgrade the plurality of components. In this way, a requirement that at least two components need to be upgraded can be flexibly met.

Figure 12A:
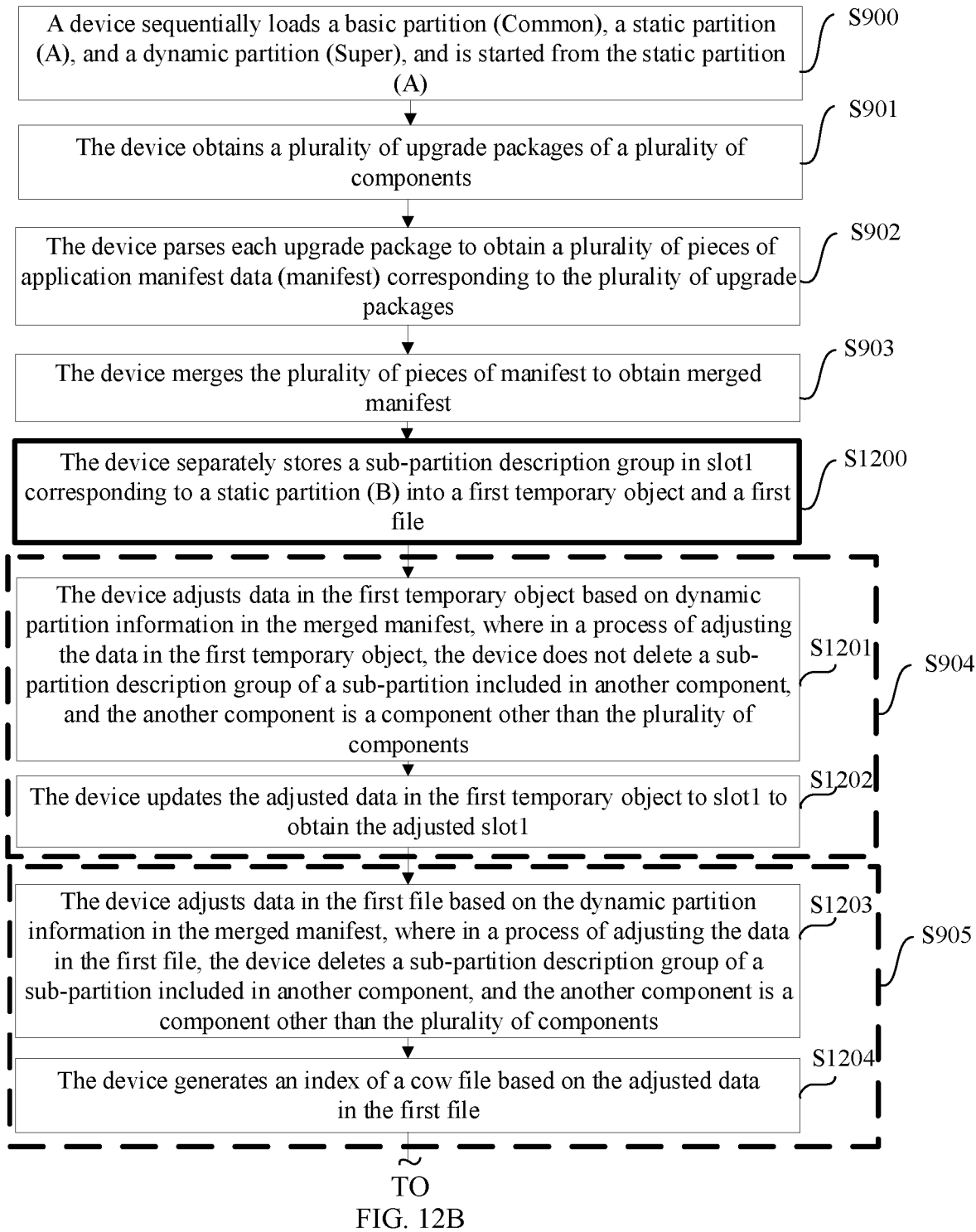

Further, the device may use the sub-partition description group in the unadjusted slot1 as basic data for adjusting slot1 and creating the index of the cow file, and then obtain the adjusted slot1 and the index of the cow file by using a modification operation such as create, read, update, and delete. Specifically, as shown in FIG. 12A and FIG. 12B, before S904 and S905 in the procedure shown in FIG. 9A and FIG. 9B, S1200 is further included.

S1200: The device separately stores a sub-partition description group in slot1 corresponding to the static partition (B) into a first temporary object and a first file.

The first temporary object (for example, target_metadata) is a temporary object created by an update engine process, and is used to adjust slot1. The first file (for example, lp_metadata) is a file created by the update engine in the metadata (metadata) of the basic partition (Common), and is used to create the index of the cow file. For ease of description, the first file may also be referred to as a target file.

Specifically, the device may copy the sub-partition description group in slot1 (which is the unadjusted slot1 in this case) corresponding to the static partition (B) to the first temporary object and the first file, to respectively serve as basic data for adjusting slot1 and basic data for creating the index of the cow file.

Still as shown in FIG. 12A and FIG. 12B, S904 in FIG. 9A and FIG. 9B further includes S1201 and S1202.

S1201: The device adjusts data in the first temporary object based on the dynamic partition information in the merged manifest. In a process of adjusting the data in the first temporary object, the device does not delete a sub-partition description group of a sub-partition included in another component, and the another component is a component other than the plurality of components.

For specific implementation of adjusting the data in the first temporary object in S1201, refer to the foregoing descriptions of adjusting slot in S904. Details are not described herein again.

S1202: The device updates the adjusted data in the first temporary object to slot1 to obtain the adjusted slot1.

Specifically, the device may write the adjusted data in the first temporary object into slot1, and overwrite original data in slot1, to obtain the adjusted slot1. In addition, after the adjusted data in the first temporary object is written into slot1, the first temporary object is released.

After S1201 and S1202, the device adjusts slot1 in the first temporary object without directly adjusting slot1. In this way, an adjustment process is not directly targeted at slot1, so that the adjustment process can be prevented from affecting operation of the operating system.

Still as shown in FIG. 12A and FIG. 12B, S905 in FIG. 9A further includes S1203 and S1204.

S1203: The device adjusts the data in the first file based on the dynamic partition information in the merged manifest. In a process of adjusting the data in the first file, the device deletes a sub-partition description group of a sub-partition included in another component, and the another component is a component other than the plurality of components.

That the plurality of components are the version component and the preload component is still used as an example.

In this case, sub-partitions involved in the dynamic partition information in the merged manifest are the version partition and the preload partition, and the another component is the base component. If the basic data in the first file is shown in (a) in FIG. 13, when adjusting the data in the first file, the device deletes a sub-partition description group of a sub-partition (for example, system or product) included in the base component. Data left after deletion is shown in (b) in FIG. 13, and only sub-partition description groups of the version partition and the preload partition are left.

S1204: The device generates the index of the cow file based on the adjusted data in the first file.

The device may generate the file name of the cow file based on a value of a name entry in the remaining description group in the first file and the naming rule of the cow file, and use the file name as the index of the cow file. For details, refer to the foregoing descriptions in S904. For ease of description, the generated file name of the cow file may be referred to as a first file name, and the first file name corresponds to sub-partitions in the dynamic partition that are involved in the plurality of components.

After S1203 and S1204, if the device uses the data in the unadjusted slot1 as the basic data for creating the index of the cow file, the index may be created through simple create, read, update, and delete.

Figure 14A:
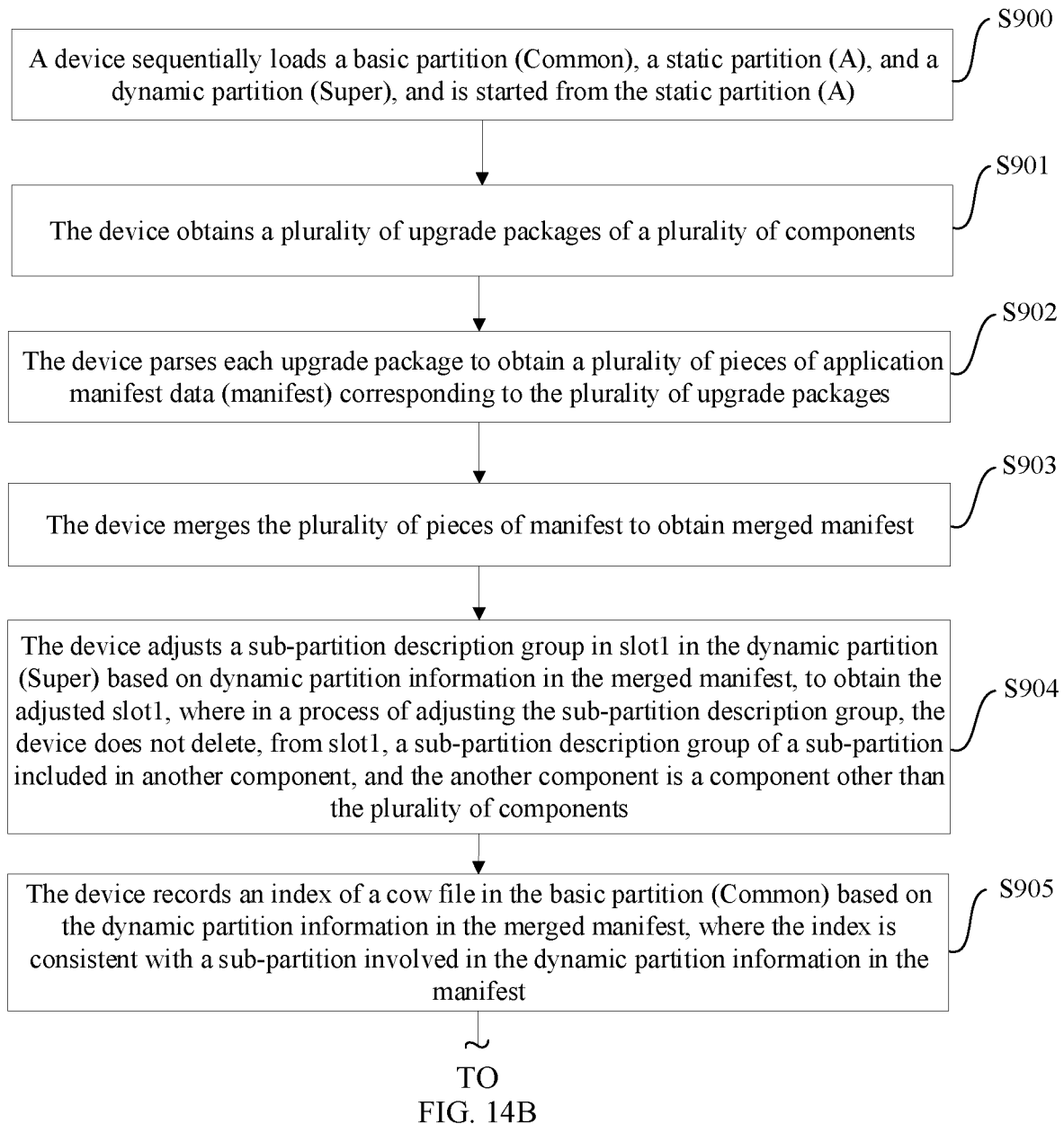
FIG. 14A and FIG. 14B are a flowchart of upgrade of an operating system according to an embodiment of this application.
Figure 14B:
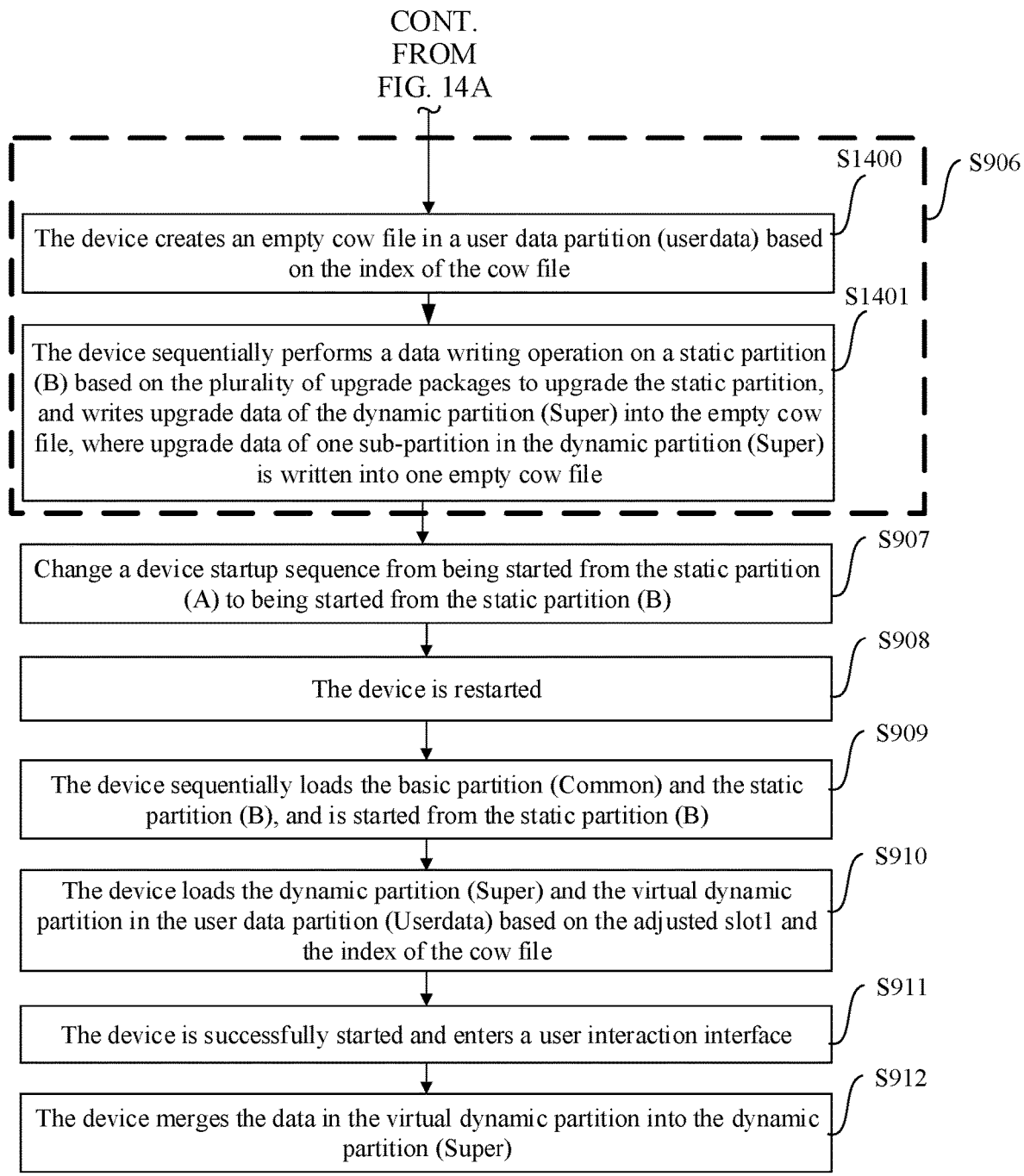

Further, after creating the index of the cow file, the device may further create an empty cow file (which may also referred to as an initial cow file) in the user data partition (Userdata) based on the index, to store upgrade data. Creating the empty cow file may be understood as the foregoing creating the virtual dynamic partition. Specifically, as shown in FIG. 14A and FIG. 14B, S906 in FIG. 9B further includes S1400 and S1401.

S1400: The device creates an empty cow file in the user data partition (Userdata) based on the index of the cow file.

Related information of each sub-partition that needs to be upgraded in the dynamic partition, such as a name of the sub-partition or a name of a cow file corresponding to the sub-partition, is recorded in the index of the cow file. The device may generate, based on the related information, an empty cow file corresponding to each sub-partition that needs to be upgraded in the dynamic partition. For example, a partition name "version" is recorded in the index of the cow file. The device may generate, based on the naming rule of the cow file, a name of the cow file corresponding to the version partition as version_b_cow_img. A suffix _b corresponds to the static partition (B), and may be read when the device is restarted from the static partition (B), to load the dynamic partition. Then, the device creates an empty cow file named version_b_cow_img in the user data partition (Userdata), and sets, based on a size of the version partition, a size of space occupied by the cow file, to reserve enough space for storing the upgrade data. The device may obtain the size of the version partition based on the size of the version partition in the manifest.

In some embodiments, the index of the cow file includes the name of the cow file. For details, refer to descriptions in S905. In this embodiment, the device may directly create, in the user data partition (Userdata), a cow file named by using a name, and set, based on the size of the partition, a size of space occupied by the cow file. For ease of description, an initial cow file generated based on the first file name may be referred to as a first initial cow file, and an initial cow file generated based on the second file name may be referred to as a second initial cow file. It should be noted that if there are a plurality of first sub-partitions, there are a plurality of first file names, and correspondingly, there are also a plurality of first initial cow files. Similarly, if there are a plurality of second sub-partitions, there are a plurality of second file names, and correspondingly, there are also a plurality of second initial cow files.

It should be noted herein that an occasion for creating the empty cow file in S1400 is not limited to a sequence shown in FIG. 14A and FIG. 14B. In actual implementation, the empty cow file may be created at any time after the index of the cow file is created. In addition, after obtaining the upgrade package, the device runs normally until being restarted, and running data is always occupying space of the user data partition (Userdata). Therefore, earlier time of creating the empty cow file leads to earlier time of occupying space for storing the upgrade data. In this way, insufficient space for storing the upgrade data that is caused when excessive space of the user data partition (Userdata) is occupied by running of the device can be avoided.

S1401: The device sequentially performs a data writing operation on the static partition (B) based on the plurality of upgrade packages to upgrade the static partition, and writes the upgrade data of the dynamic partition (Super) into the empty cow file. Upgrade data of one sub-partition in the dynamic partition (Super) is written into one empty cow file.

For example, the first upgrade data is written into the first initial cow file, and the second upgrade data is written into the second initial cow file.

In this embodiment, the device creates the empty cow file based on the index of the cow file, to occupy space for storing the upgrade data, so as to avoid a case in which there is no enough space for storing the upgrade data due to running of the device.

Figure 15:
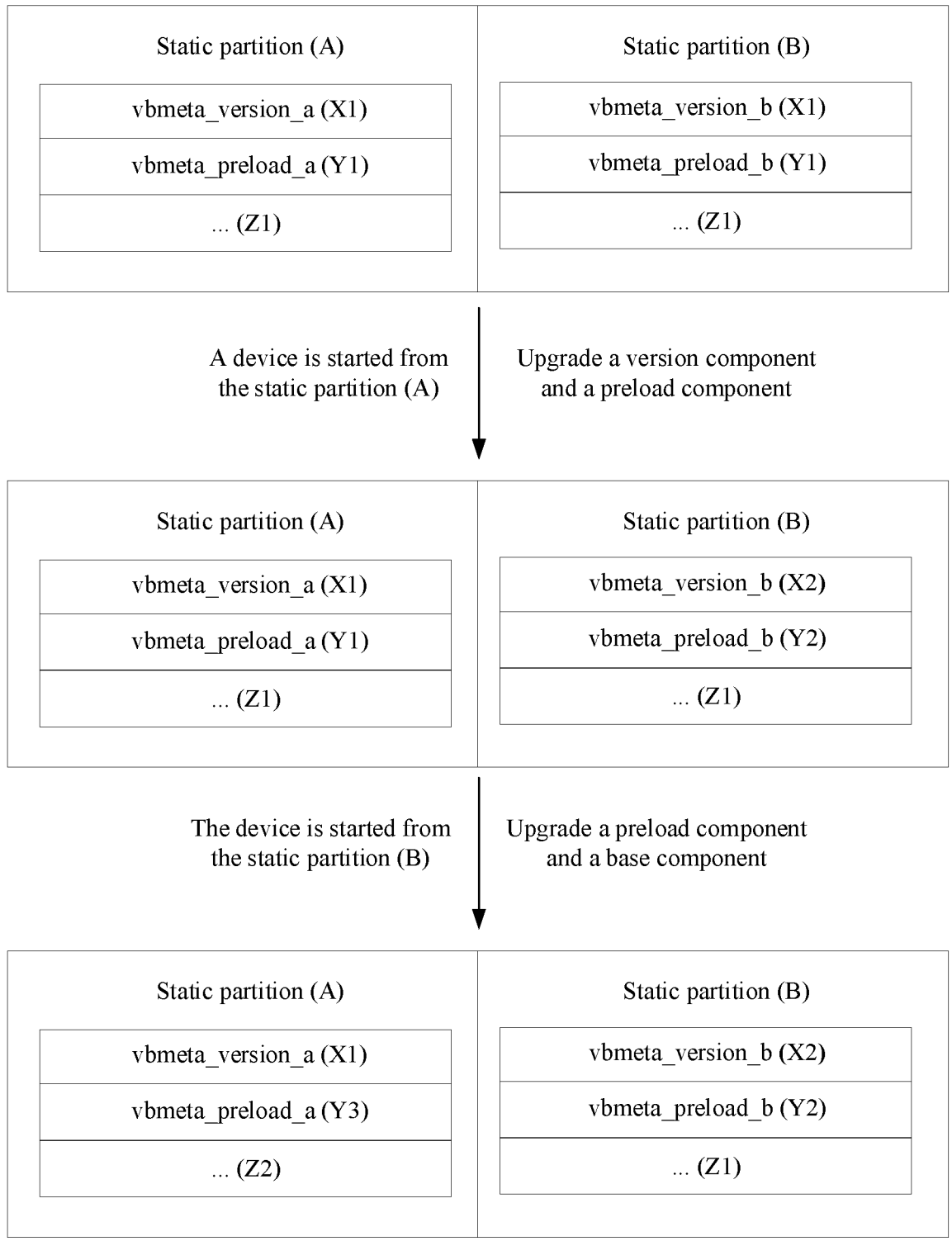
FIG. 15 is a schematic diagram of data updating according to an embodiment of this application.

As shown in FIG. 15, in a scenario, after the device is delivered from a factory, initial data in the static partition (A) and initial data in the static partition (B) are the same, initial data in the vbmeta_version partition is X1, initial data in the vbmeta_preload partition is Y1, and initial data in another sub-partition is Z1. If the device is currently started from the static partition (A) and the version component and the preload component currently need to be upgraded, when updating data in the static partition (for example, in S906), the device updates data in the vbmeta_version partition in the static partition (B), to obtain updated data X2, and updates data in the vbmeta_preload partition in the static partition (B), to obtain updated data Y2. In this case, the data in the vbmeta_version partition in the static partition (A) and the data in the vbmeta_version partition in the static partition (B) are different. Then, when the device is currently started from the static partition (B) and the preload component and the base component currently need to be upgraded, when updating data in the static partition (for example, in S906), the device updates data in the vbmeta_preload partition in the static partition (B), to obtain updated data Y3, and updates data in the system partition and the system_ext partition (sub-partitions included in the base component) in the static partition (B), to obtain updated data Z2. In this case, although the data in the sub-partitions included in the preload component and the base component is updated, data in a vbmeta_version partition included in a version component that does not currently need to be upgraded is still the initial data X1 instead of the previously updated X2. In this way, the data in the static partition (B) is not data corresponding to a latest version.

Figure 16A:
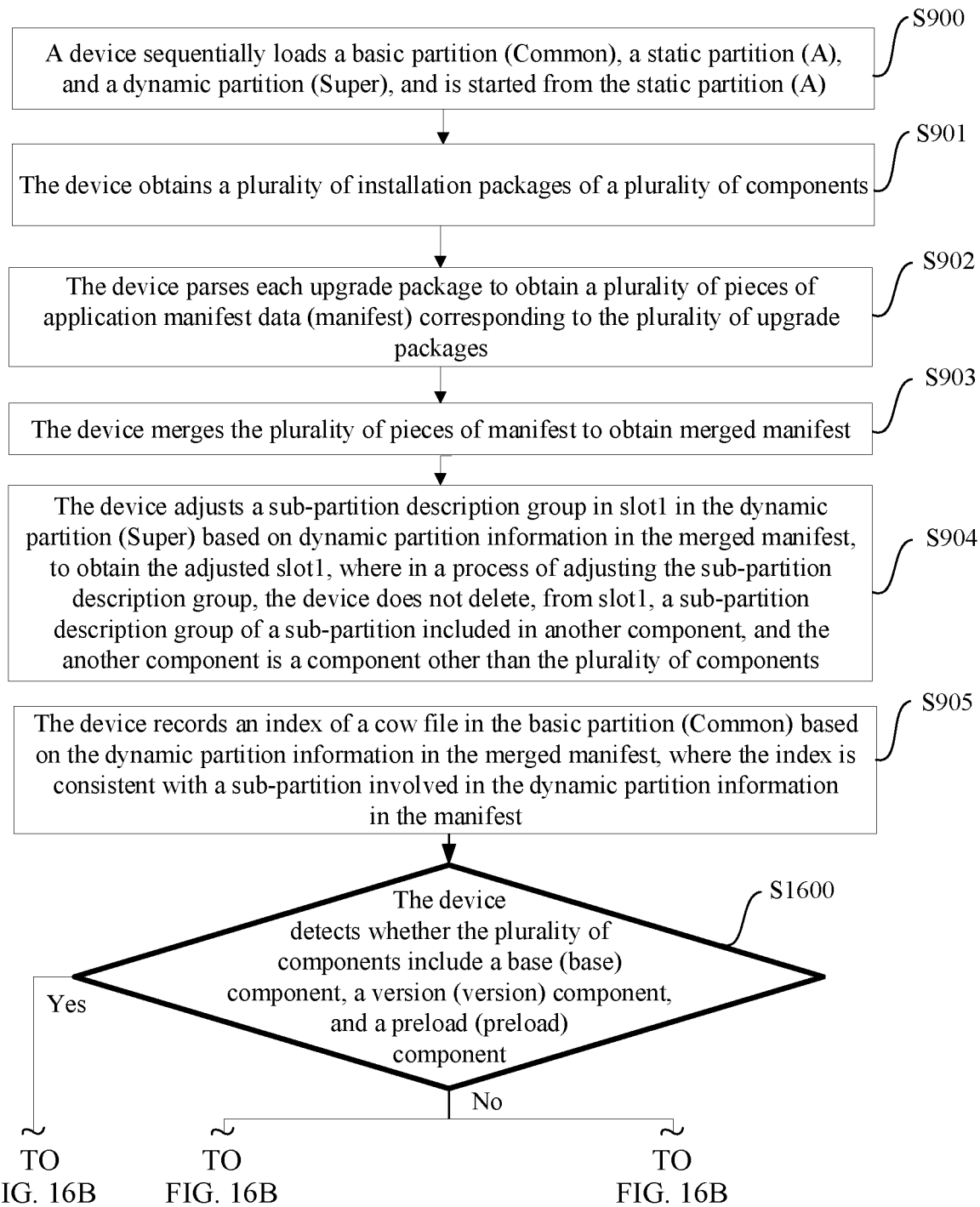
FIG. 16A and FIG. 16B are a flowchart of upgrade of an operating system according to an embodiment of this application.
Figure 16B:
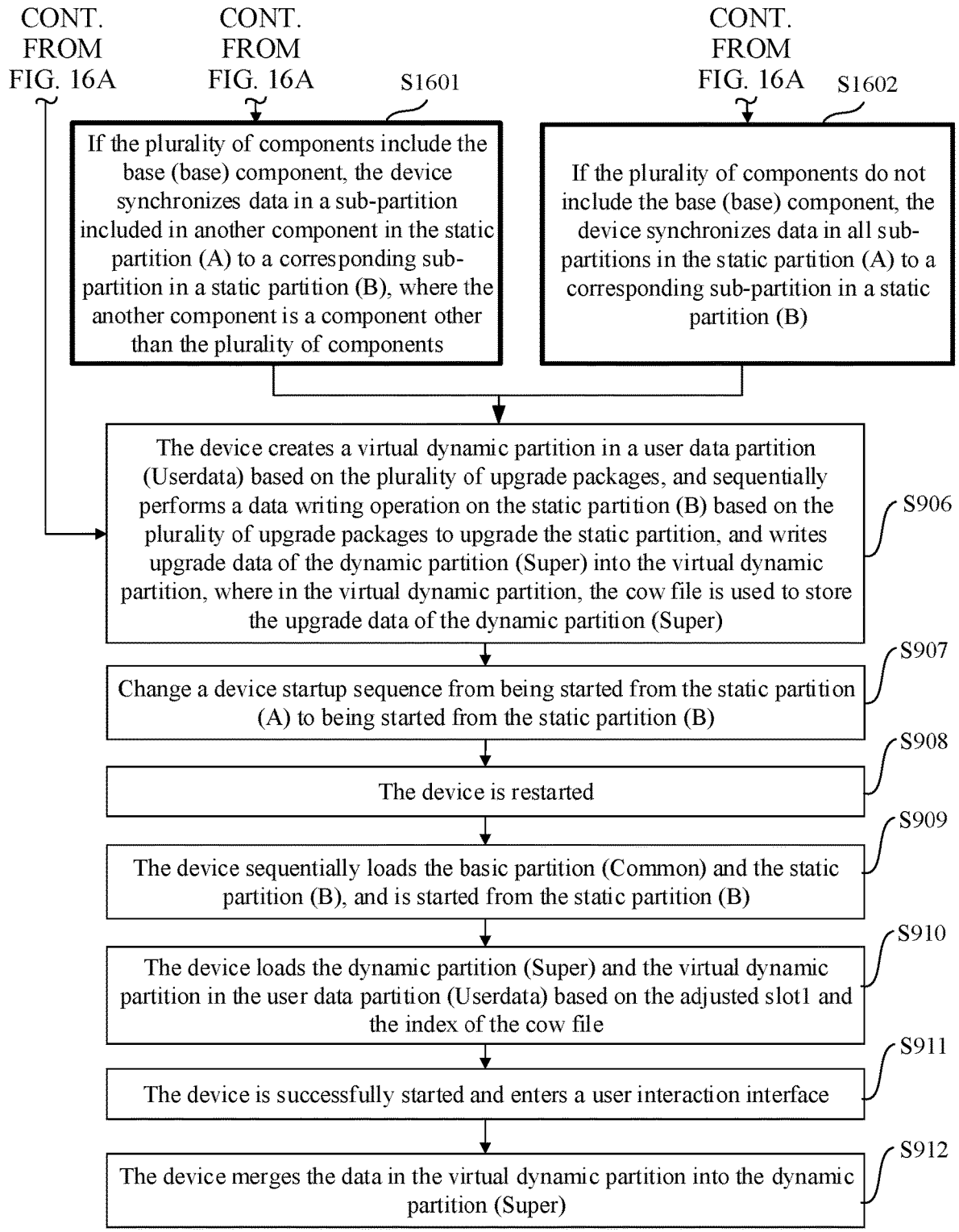

For this scenario, in some embodiments, if the plurality of components are two of the base component, the version component, and the preload component, and the device is currently started from the static partition (A), the device may synchronize, after obtaining the plurality of upgrade packages, latest data in a sub-partition included in another component (that is, a component that currently does not need to be upgraded) in the static partition (A) to the static partition (B). Alternatively, if the device is currently started from the static partition (B), the device may synchronize, after obtaining the plurality of upgrade packages, latest data in a sub-partition included in another component (that is, a component that currently does not need to be upgraded) in the static partition (B) to the static partition (A). Therefore, the latest data in the sub-partition included in the component that does not need to be upgraded is kept synchronized between the static partition (A) and the static partition (B). Specifically, when the device is currently started from the static partition (A), as shown in FIG. 16A and FIG. 16B, after S902 and before S906 in FIG. 9A and FIG. 9B, S1600 and S1601 are further included.

S1600: The device detects whether the plurality of components include the base (base) component, the version (version) component, and the preload (preload) component. If yes, S906 is performed. If no, S1601 or S1602 is performed.

If the plurality of components include the base component, the version component, and the preload component, it indicates that all the components need to be upgraded. Correspondingly, sub-partitions included in all the components need to be updated. All the components certainly relate to all sub-partitions of the static partitions (B); in other words, all the sub-partitions in the static partition (B) need to be updated, and there is no sub-partition (for example, the seventh sub-partition) that does not need to be updated. In this case, the device does not need to first synchronize the latest data between the static partition (A) and the static partition (B), but may directly traverse the plurality of upgrade packages to update data.

If the plurality of components do not include all the base component, the version component, and the preload component, it indicates that only some components need to be upgraded. In other words, only some sub-partitions in the static partition (B) need to be updated. In other words, some sub-partitions (for example, the seventh sub-partition) in the static partition (B) do not need to be updated. In this case, the device needs to synchronize the latest data between the static partition (A) and the static partition (B).

S1601: If the plurality of components include the base (base) component, the device synchronizes the data in the sub-partition included in the another component in the static partition (A) to a corresponding sub-partition in the static partition (B). The another component is a component other than the plurality of components.

There are two cases in which the plurality of components include the base component: The plurality of components are the base component and the version component, or the base component and the preload component. Correspondingly, the another component other than the plurality of components does not include the base component.

Generally, in all data of the static partition, data included in the base component accounts for a majority, but data included in the version component and the preload component is merely a small part. Therefore, when the plurality of components include the base component, the device may synchronize the data in the sub-partition (for example, the seventh sub-partition) included in the another component in the static partition (A) to the corresponding sub-partition in the static partition (B). For example, if the plurality of components are the base component and the preload component, the another component is the version component, and the device may synchronize data in the vbmeta_version partition (that is, vbmeta_version_a) in the static partition (A) to the vbmeta_version partition (that is, vbmeta_version_b) in the static partition (B). Therefore, the device may synchronize, by using a small part of data, data of a sub-partition that currently does not need to be upgraded in the static partition.

For ease of description, a sub-partition with a large data amount that is involved in the static partition (B), for example, a sub-partition that is involved in the base (base) component in the static component, may be referred to as a preset sub-partition.

S1602: If the plurality of components do not include the base (base) component, the device synchronizes data in all sub-partitions in the static partition (A) to a corresponding sub-partition in the static partition (B).

If the plurality of components are the version component and the preload component, the plurality of components do not include the base component. Correspondingly, the another component is the base component. In other words, most data in the static partition does not need to be upgraded. Therefore, when the plurality of components do not include the base component, the device may directly synchronize data in all sub-partitions in the static partition (A) to the corresponding sub-partition in the static partition (B). In this way, when most data does not need to be upgraded, the device does not need to remove data that does not need to be synchronized from the static partition (A), so that a synchronization step can be simplified through entire synchronization.

It should be noted herein that an execution occasion of S1600-S1602 is not limited to that shown in FIG. 16A and FIG. 16B. In actual implementation, the device may perform S1600-S1602 at any moment between S902-S906, and this is not specifically limited in this embodiment of this application.

In this embodiment, the device may synchronize latest data in a sub-partition that currently does not need to be upgraded in the static partition (A) to the static partition (B), and then update data in the static partition (B). In this way, it can be ensured that data in each sub-partition in the static partition (B) is the latest.

Figure 17A:
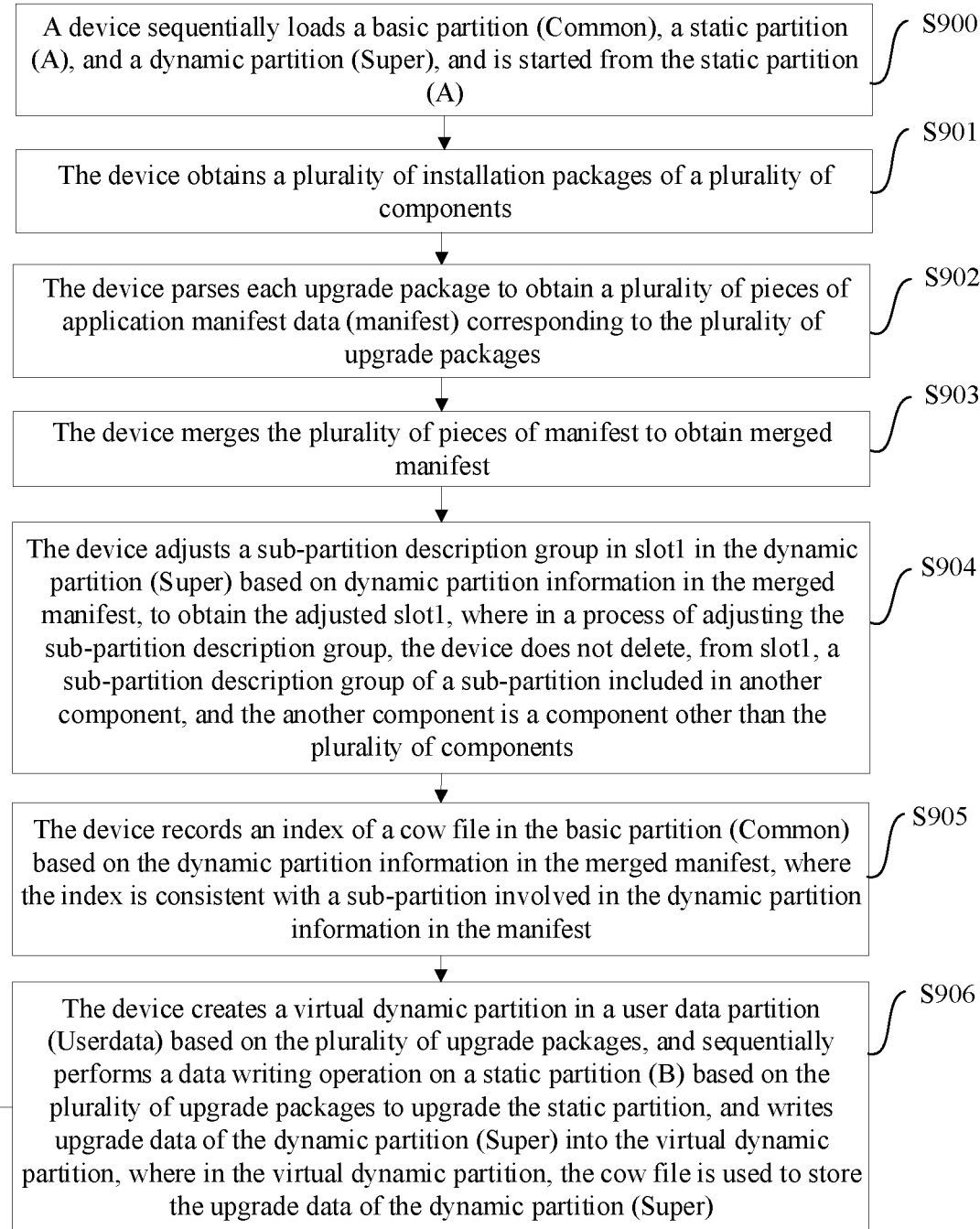
FIG. 17A and FIG. 17B are a flowchart of upgrade of an operating system according to an embodiment of this application.
Figure 17B:
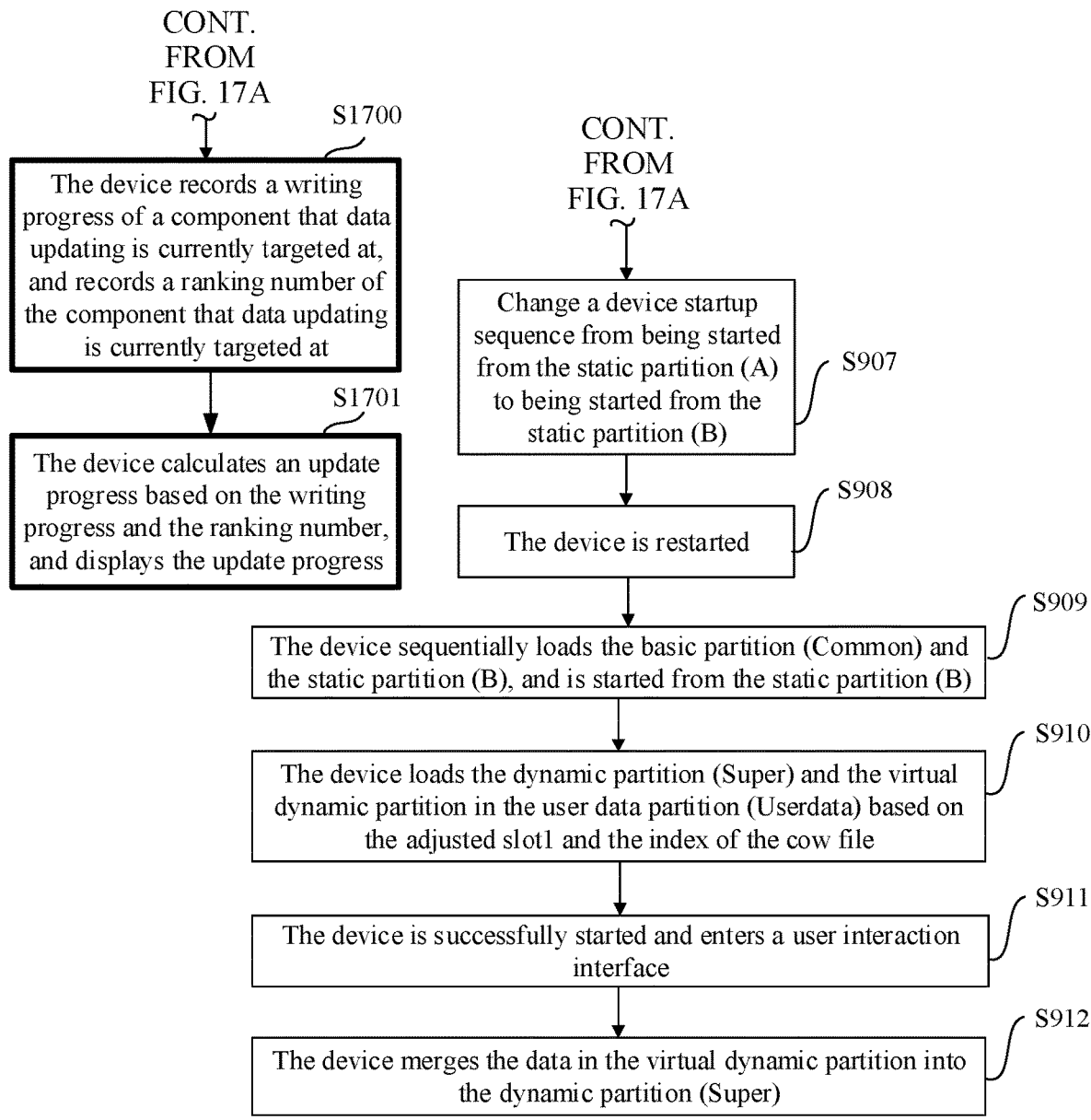

Further, in a data updating process (for example, in S906 in FIG. 9B), the device may display an update progress of data updating, for example, 50% or 80%. When the update progress reaches 100%, it indicates that data of the plurality of components is updated. As shown in FIG. 17A and FIG. 17B, in a process in which the device performs S906 in FIG. 9B, S1700 and S1701 are further included.

S1700: The device records a writing progress of a component that data updating is currently targeted at, and records a ranking number of the component that data updating is currently targeted at.

The writing progress may reflect an amount of data that has currently been written for the targeted component, and may also be referred to as a storing progress. The ranking number may reflect a ranking of the currently targeted component during update of the plurality of components. In a specific implementation, the device may record the writing progress and the ranking number (that is, payload_id, which may also be referred to as a traversing sequence number) in a directory /data/misc/update_log/perfs in the user data partition (Userdata).

For example, the plurality of upgrade packages are the version upgrade package and the preload upgrade package, and the second preset sequence is sequentially the base upgrade package, the version upgrade package, and the preload upgrade package from front to back. In this case, the device first updates data for the version component. In this case, the component that data updating is currently targeted at is the version component, and the version component is a first component in the current data update, and a ranking number is 1. In addition, as the device continuously writes data, the device may update, in real time, an amount of data that has been written for the targeted version component, that is, a writing progress for the version component. After the amount of data that has been written for the targeted version component reaches a total amount of data that needs to be written into the version component, the device may start to update data for the preload component, and in this case, the component that data update is targeted at is the preload component, and the preload component is a second component in the current data update, and therefore, the ranking number is updated to 2. Similarly, as the device continuously writes data, the device may update, in real time, an amount of data that has been written for the targeted preload component, that is, a writing progress for the preload component.

S1701: The device calculates an update progress based on the writing progress and the ranking number, and displays the update progress.

The update progress is a percentage of an amount of data that has been written into the plurality of components to a total amount of data that needs to be written into the plurality of components. The amount of data that is corresponding to the writing progress and that has been written is denoted as p, and the ranking quantity is denoted as n. In this case, the update progress q may be calculated by using the following formula: q=[SUM (an amount of data that needs to be written into first n−1 components)+p]/SUM (the amount of data that needs to be written into the plurality of components).

The example in S1700 is still used as an example. It is assumed that the writing progress is 70 pieces of data, the ranking number is 2, an amount of data that needs to be written into the version component is 200 pieces of data, and an amount of data that needs to be written into the preload component is 100 pieces of data. In this case, update progress q=(200+70)/(200+100)=90%.

In a specific implementation, the device may obtain, based on the merged manifest, a total amount of data that needs to be written into each component. Specifically, in the merged manifest, each piece of partition information includes a location of the upgrade data in a corresponding upgrade installation package, and the location includes an offset of a start location, an offset of an end location, and a size of a data amount. The size of the data amount is a data amount of a corresponding sub-partition. Then, the device may obtain a total amount of data of a corresponding component by summing up data amounts of a plurality of sub-partitions included in the same component.

In this embodiment, the device may accurately display the update progress in a process of updating data of the plurality of components.

Figure 18:
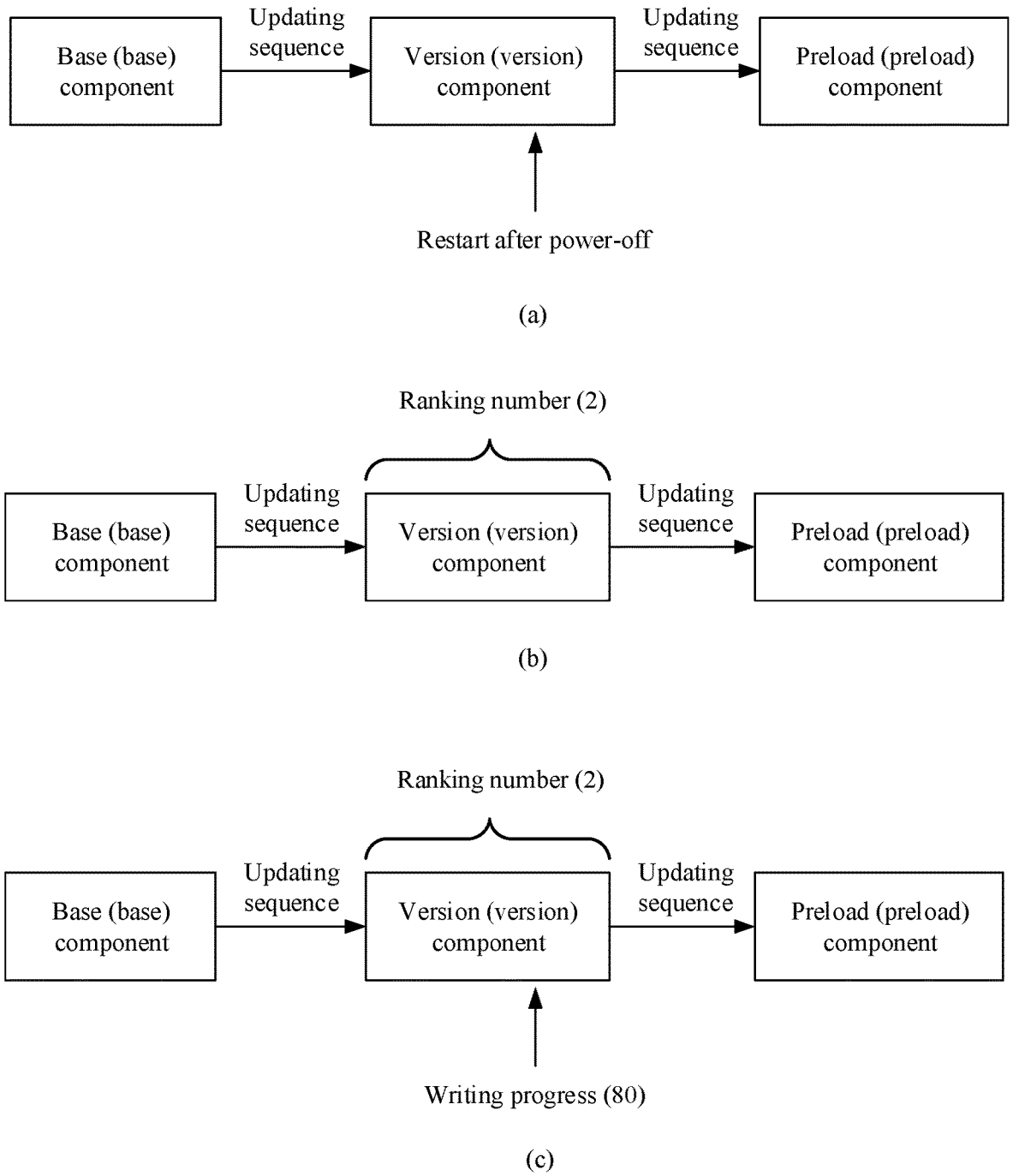
FIG. 18 is a schematic diagram of data updating after power-off according to an embodiment of this application.

Still further, as shown in (a) in FIG. 18, in some scenarios, the device updates data in such a sequence: the base component, the version component, and the preload component, and in a process of updating the version component, the device is powered off. After the device is restarted, if data is updated again from the base component, data may be repeatedly written, and upgrade is affected. In addition, upgrade duration is also affected.

Based on this problem, in some embodiments, the device may resume updating from the corresponding update progress during power-off based on the writing progress and the ranking number that are recorded in the foregoing embodiment shown in FIG. 17A and FIG. 17B. Specifically, after the device is restarted, the device may determine whether it is a case in which the device is restarted after power-off in a data updating process. If yes, it is determined that the device needs to resume (resume) data updating. The device may locate, based on the sorting number, a component that is being updated at the moment of power-off, or this may be understood as locating a target upgrade package that is being written. As shown in (b) in FIG. 18, the version component is located based on a ranking number 2, that is, data writing for the version upgrade package is being performed. Then, data (target data) that is being updated in a component that is being updated at the moment of power-off is located based on the writing progress. As shown in (c) in FIG. 18, a location at which 80 pieces of data have been written into the version component at the moment of power-off is located based on the writing progress of 80 pieces of data. Finally, the device may resume updating from the located location. In this way, flexibility of abnormal power-off processing can be improved.

Figure 19A:
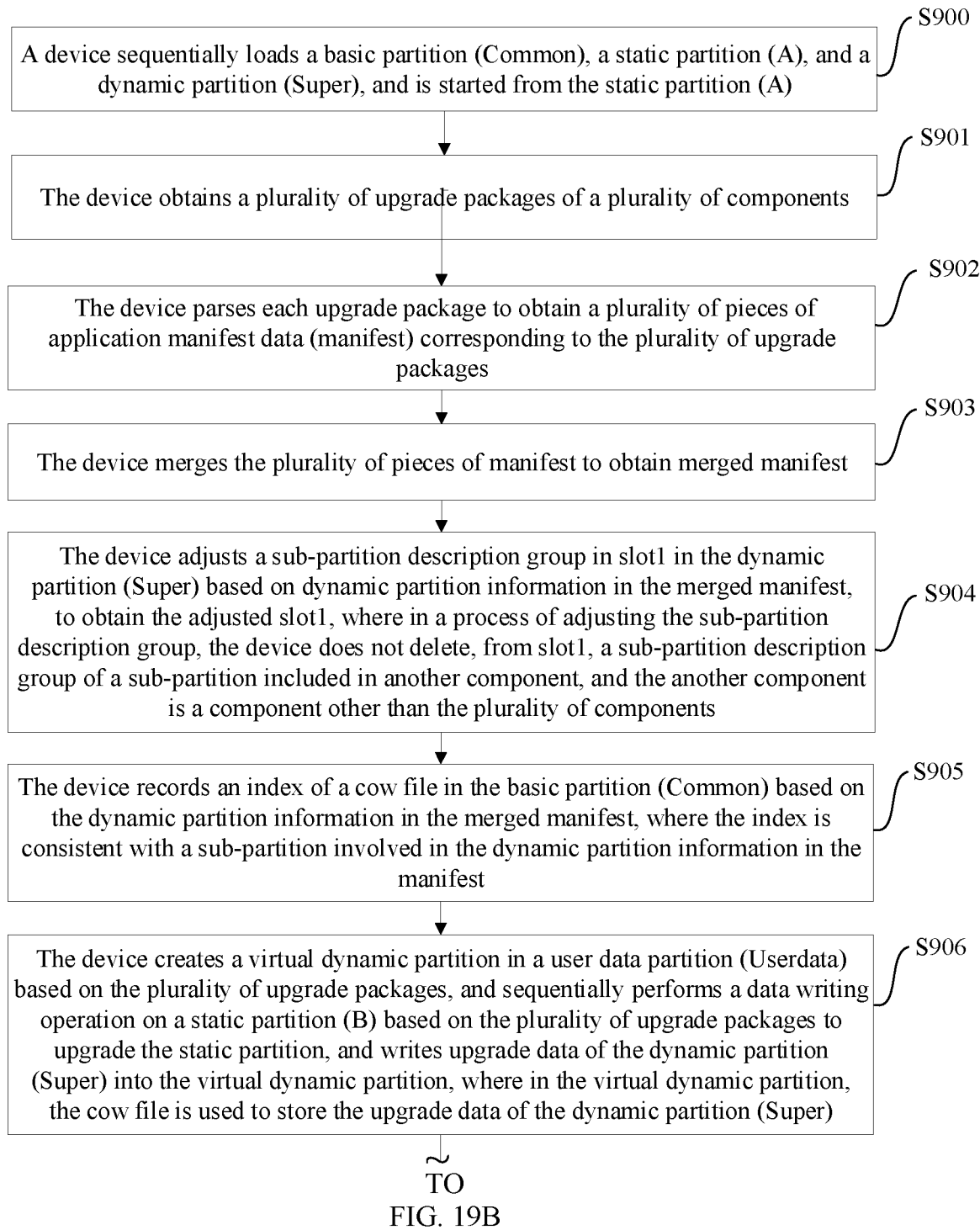
FIG. 19A and FIG. 19B are a flowchart of upgrade of an operating system according to an embodiment of this application.
Figure 19B:
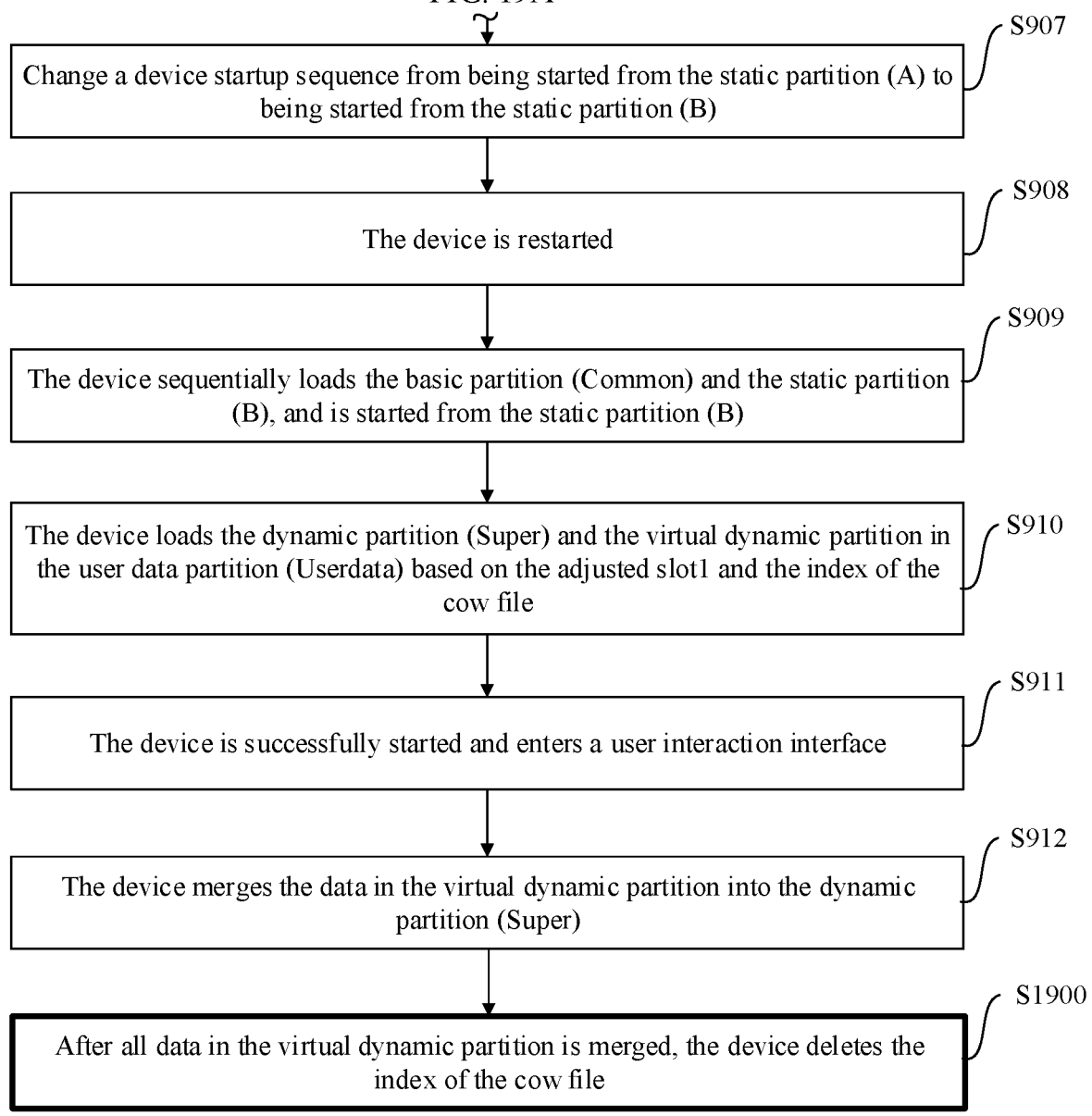

Further, after merging (S912 in FIG. 9B) is completed, the device may delete the index of the cow file. Specifically, as shown in FIG. 19A and FIG. 19B, after S912 in FIG. 9B, S1900 is further included.

S1900: After all data in the virtual dynamic partition is merged, the device deletes the index of the cow file.

If the device is powered off when data of at least one sub-partition has not been merged, after the device is restarted again, the dynamic partition needs to be loaded again based on the index of the cow file. Therefore, in this embodiment, after merging status information of all sub-partitions in the metadata (/metadata) of the basic partition (Common) is changed from "wait for merge (wait for merge)" to "merged (merged)", it indicates that all data has been merged. In this case, the index of the cow file is deleted. In this way, the device may continue to use the index of the cow file to load the dynamic partition when the device is abnormally restarted after power-off in a merging process.

An embodiment of this application provides an electronic device. The electronic device may include a memory and one or more processors. The memory is coupled to the processor. The memory is configured to store computer program code, and the computer program code includes computer instructions. When the processor executes the computer instructions, the electronic device may perform the functions or steps performed by the electronic device in the foregoing method embodiments.

Figure 20:
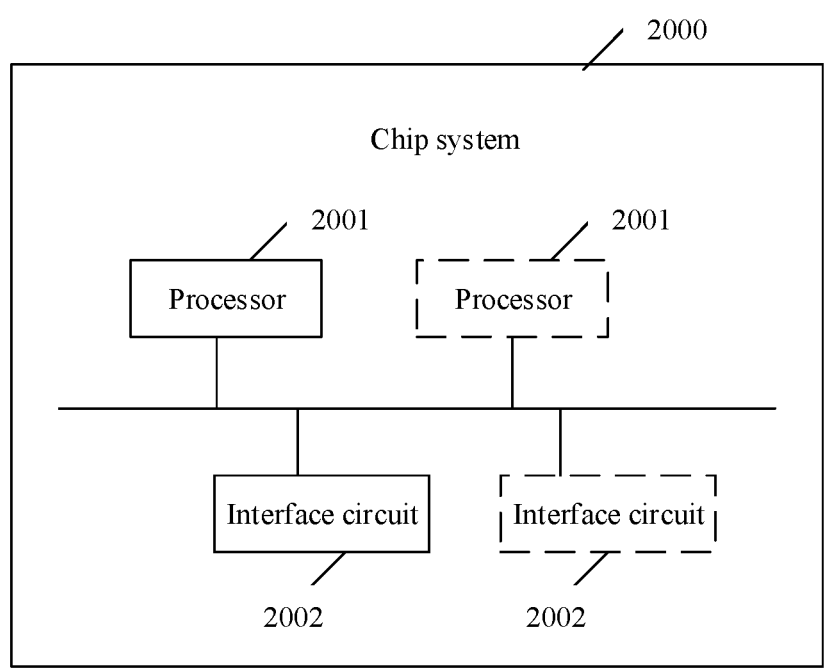
FIG. 20 is a schematic diagram of a structure of a chip system according to an embodiment of this application.

An embodiment of this application further provides a chip system. As shown in FIG. 20, a chip system 2000 includes at least one processor 2001 and at least one interface circuit 2002. The processor 2001 and the interface circuit 2002 may be interconnected by using a wire. For example, the interface circuit 2002 may be configured to receive a signal from another apparatus (for example, a memory of an electronic device). For another example, the interface circuit 2002 may be configured to transmit a signal to another apparatus (for example, the processor 2001). For example, the interface circuit 2002 may read the instructions stored in the memory, and send the instructions to the processor 2001. When the instructions are executed by the processor 2001, the electronic device may be enabled to perform steps in the foregoing embodiments. Certainly, the chip system may further include another discrete component. This is not specifically limited in this embodiment of this application.

An embodiment of this application further provides a computer storage medium. The computer storage medium includes computer instructions, and when the computer instructions are run on an electronic device, the electronic device is enabled to perform the functions or steps performed by the electronic device in the foregoing method embodiments.

An embodiment of this application further provides a computer program product. When the computer program product is run on a computer, the computer is enabled to perform the functions or steps performed by the device in the foregoing method embodiments.

It may be clearly learned by a person skilled in the art from the foregoing descriptions of the implementations that, for convenience and brevity of description, division into only the foregoing function modules is used as an example for description. In actual application, the foregoing functions may be allocated to different function modules for implementation according to a requirement, that is, an internal structure of an apparatus is divided into different function modules, to complete all or some of the functions described above.

In the several embodiments provided in this application, it should be understood that the disclosed apparatus and method may be implemented in other manners. For example, the described apparatus embodiments are merely examples. For example, division into the modules or units is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, that is, may be located in one place, or may be distributed in a plurality of different places. Some or all of the units may be selected according to actual requirements to achieve the purpose of the solutions in the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium, and includes several instructions for instructing a device (which may be a single-chip microcomputer, a chip, or the like) or a processor (processor) to perform all or some of the steps of the methods described in embodiments of this application. The storage medium includes various media that can store program code, for example, a USB flash drive, a removable hard disk, a read-only memory (read only memory, ROM), a random access memory (random access memory, RAM), a magnetic disk, or an optical disk.

The foregoing content is merely specific implementations of this application, but is not intended to limit the protection scope of this application. Any variation or replacement made within the technical scope disclosed in this application shall fall within the protection scope of this application. Therefore, the protection scope of this application shall be subject to the protection scope of claims.

What is claimed is:

1. An operating system upgrading method, applied to an electronic device, wherein the electronic device comprises a processor and a memory, the memory comprises a basic partition, a first static partition, a second static partition, a dynamic partition, and a user data partition, the dynamic partition comprises first slot data and second slot data, the dynamic partition comprises a plurality of sub-partitions, the first slot data comprises a plurality of first description groups corresponding to the plurality of sub-partitions, and the second slot data comprises a plurality of second description groups corresponding to the plurality of sub-partitions; and the method comprises:

loading data in the basic partition, the first static partition, and the dynamic partition to run a first operating system;

reading the plurality of first description groups in a process of loading the data in the dynamic partition to run the first operating system, and loading the data in the dynamic partition to run the first operating system based on values of address entries in the plurality of first description groups;

obtaining a first upgrade installation package and a second upgrade installation package, wherein the first upgrade installation package is used to upgrade a first sub-partition, the second upgrade installation package is used to upgrade a second sub-partition, the first sub-partition and the second sub-partition are comprised in the plurality of sub-partitions in the dynamic partition, the first upgrade installation package comprises first data, the first data comprises partition information of the first sub-partition, the second upgrade installation package comprises second data, and the second data comprises partition information of the second sub-partition;

obtaining a plurality of third description groups based on third data and the plurality of second description groups, wherein the third data comprises the partition information of the first sub-partition and the partition information of the second sub-partition, the plurality of third description groups comprise a description group corresponding to the first sub-partition, a description group corresponding to the second sub-partition, and a description group corresponding to a third sub-partition, and the third sub-partition is a sub-partition in the plurality of sub-partitions in the dynamic partition other than the first sub-partition and the second sub-partition; and restarting the electronic device, loading data in the basic partition, the second static partition, and the dynamic partition to run a second operating system, reading values of address entries in the plurality of third description groups in the process of loading the data in the dynamic partition to run the second operating system, and loading the data in the dynamic partition to run the second operating system based on the values of the address entries in the plurality of third description groups.

2. The method according to claim 1, wherein after the obtaining a first upgrade installation package and a second upgrade installation package, the method further comprises:

writing the plurality of second description groups into a target file, deleting the description group corresponding to the third sub-partition from the target file, and generating a first index.

3. The method according to claim 2, wherein after the loading data in the basic partition, the first static partition, and the dynamic partition to run the first operating system, the method further comprises:

obtaining a third upgrade installation package, wherein the third upgrade installation package is used to upgrade a fourth sub-partition, the fourth sub-partition is a sub-partition comprised in the plurality of sub-partitions in the dynamic partition, the third upgrade installation package comprises the third data, and the third data comprises partition information of the fourth sub-partition; and wherein obtaining the plurality of third description groups comprises obtaining the plurality of third description groups based on the third data and the plurality of second description groups, wherein the third data further comprises the partition information of the fourth sub-partition, and the third sub-partition is a sub-partition comprised in the plurality of sub-partitions in the dynamic partition other than the first sub-partition, the second sub-partition, and the fourth sub-partition.

4. The method according to claim 3, wherein the first upgrade installation package comprises first upgrade data, the first upgrade data is used to upgrade the first sub-partition, the second upgrade installation package comprises second upgrade data, and the second upgrade data is used to upgrade the second sub-partition; and wherein the method further comprises:

storing the first upgrade data and the second upgrade data in the user data partition; and reading the target file in the process of loading the data in the dynamic partition to run the first operating system, and loading the first upgrade data and the second upgrade data in the user data partition based on the first index in the target file.

5. The method according to claim 4, wherein the deleting the description group corresponding to the third sub-partition from the target file, and generating a first index comprises:

deleting the description group corresponding to the third sub-partition from the target file, to obtain the description group corresponding to the first sub-partition and the description group corresponding to the second sub-partition, wherein the description group corresponding to the first sub-partition comprises a name of the first sub-partition, and the description group corresponding to the second sub-partition comprises a name of the second sub-partition; and generating, based on the name of the first sub-partition, a first file name corresponding to the first sub-partition, and generating, based on the name of the second sub-partition, a second file name corresponding to the second sub-partition, wherein the first index comprises the first file name and the second file name.

6. The method according to claim 5, wherein after the generating, based on the name of the first sub-partition, a first file name corresponding to the first sub-partition, and generating, based on the name of the second sub-partition, a second file name corresponding to the second sub-partition, the method further comprises:

creating, in the user data partition, a first initial copy-on-write (cow) file whose file name is the first file name and a second initial cow file whose file name is the second file name, wherein no upgrade data is stored in the first initial cow file and the second initial cow file; and wherein the storing the first upgrade data and the second upgrade data in the user data partition comprises:

storing the first upgrade data in the first initial cow file, and storing the second upgrade data in the second initial cow file.

7. The method according to claim 1, wherein the first sub-partition comprises first one or more sub-partitions of the plurality of sub-partitions, the second sub-partition comprises second one or more sub-partitions of the plurality of sub-partitions, and the third sub-partition comprises third one or more sub-partitions of the plurality of sub-partitions.

8. The method according to claim 4, wherein the second static partition comprises a second plurality of sub-partitions, the first upgrade installation package further comprises third upgrade data, the third upgrade data is used to upgrade a fifth sub-partition, the second upgrade installation package further comprises fourth upgrade data, the fourth upgrade data is used to upgrade a sixth sub-partition, and the fifth sub-partition and the sixth sub-partition are sub-partitions in the second plurality of sub-partitions of the second static partition; and after the obtaining a first upgrade installation package and a second upgrade installation package, the method further comprises:

writing the third upgrade data into the fifth sub-partition, and writing the fourth upgrade data into the sixth sub-partition.

9. The method according to claim 8, wherein the first static partition comprises a third plurality of sub-partitions, and the third plurality of sub-partitions in the first static partition are in a one-to-one correspondence with the second plurality of sub-partitions in the second static partition; and before the writing the third upgrade data into the fifth sub-partition, and writing the fourth upgrade data into the sixth sub-partition, the method further comprises:

when the second plurality of sub-partitions of the second static partition comprises a seventh sub-partition, detecting whether the fifth sub-partition and the sixth sub-partition comprise a preset sub-partition, wherein the seventh sub-partition is a sub-partition in the second plurality of sub-partitions of the second static partition other than the fifth sub-partition and the sixth sub-partition;

when the fifth sub-partition and the sixth sub-partition comprise the preset sub-partition, synchronizing data in the seventh sub-partition in the first static partition into the seventh sub-partition in the second static partition; and when the fifth sub-partition and the sixth sub-partition do not comprise the preset sub-partition, synchronizing data in all sub-partitions in the first static partition into a corresponding sub-partition in the second static partition.

10. The method according to claim 9, wherein the writing the third upgrade data into the fifth sub-partition, and writing the fourth upgrade data into the sixth sub-partition comprises:

when the second static partition does not comprise the seventh sub-partition, writing the third upgrade data into the fifth sub-partition, and writing the fourth upgrade data into the sixth sub-partition.

11. The method according to claim 10, wherein the storing the first upgrade data and the second upgrade data in the user data partition comprises:

traversing the first upgrade installation package and the second upgrade installation package, storing the first upgrade data in the user data partition when the first upgrade installation package is traversed, and storing the second upgrade data in the user data partition when the second upgrade installation package is traversed; and the method further comprises:

recording a storage progress of upgrade data comprised in a currently traversed upgrade installation package, and recording a traversing sequence number of the currently traversed upgrade installation package; and calculating an update progress corresponding to the storage progress and the traversing sequence number, and displaying the update progress.

12. The method according to claim 11, wherein in a process of storing the first upgrade data and the second upgrade data in the user data partition, the method further comprises:

when the electronic device is restarted after power-off, locating, in the first upgrade installation package and the second upgrade installation package, a target upgrade installation package corresponding to the traversing sequence number, and locating, in upgrade data of the target upgrade installation package, target data corresponding to the storage progress; and continuing to store the first upgrade data and the second upgrade data in the user data partition from the target data of the target upgrade installation package.

13. The method according to claim 1, wherein before the obtaining a plurality of third description groups based on third data and the plurality of second description groups, the method further comprises:

merging the first data and the second data to obtain the third data.

14. The method according to claim 13, wherein after the loading data in the basic partition, the second static partition, and the dynamic partition to run the second operating system, the method further comprises:

merging a plurality of pieces of first upgrade data and a plurality of pieces of second upgrade data in the user data partition into a corresponding sub-partition in the dynamic partition.

15. An electronic device, comprising:

a processor and a memory, wherein the memory comprises a basic partition, a first static partition, a second static partition, a dynamic partition, and a user data partition, the dynamic partition comprises a plurality of sub-partitions, and the processor is configured to execute software code stored in the memory, enabling the electronic device to load data in the basic partition, the first static partition, and the dynamic partition after being started, to run a first operating system; and after the first operating system is run, executing software code stored in the memory causes the electronic device to be enabled to perform the following operations:

reading a plurality of first description groups in a process of loading the data in the dynamic partition to run the first operating system;

loading the data in the dynamic partition to run the first operating system based on values of address entries in the plurality of first description groups;

obtaining a first upgrade installation package and a second upgrade installation package, wherein the first upgrade installation package is configured to be used to upgrade a first sub-partition, the second upgrade installation package is configured to be used to upgrade a second sub-partition, the first sub-partition and the second sub-partition are comprised in the plurality of sub-partitions of the dynamic partition, the first upgrade installation package comprises first data, the first data comprises partition information of the first sub-partition, the second upgrade installation package comprises second data, and the second data comprises partition information of the second sub-partition;

obtaining a plurality of third description groups based on third data and a plurality of second description groups, wherein the third data comprises the partition information of the first sub-partition and the partition information of the second sub-partition, the plurality of third description groups comprise a description group corresponding to the first sub-partition, a description group corresponding to the second sub-partition, and a description group corresponding to a third sub-partition, and the third sub-partition is comprised in the plurality of sub-partitions in the dynamic partition other than the first sub-partition and the second sub-partition; and restarting the electronic device, loading data in the basic partition, the second static partition, and the dynamic partition to run a second operating system, reading values of address entries in the plurality of third description groups in the process of loading the data in the dynamic partition to run the second operating system, and loading the data in the dynamic partition to run the second operating system based on the values of the address entries in the plurality of third description groups.

16. A non-transitory computer-readable storage medium, wherein the non-transitory computer-readable storage medium stores a computer program, and when the computer program is run on an electronic device, the electronic device is enabled to perform the following operations:

loading data in a basic partition, a first static partition, and a dynamic partition to run a first operating system, reading a plurality of first description groups in a process of loading the data in the dynamic partition to run the first operating system, and loading the data in the dynamic partition to run the first operating system based on values of address entries in the plurality of first description groups;

obtaining a first upgrade installation package and a second upgrade installation package, wherein the first upgrade installation package is configured to be used to upgrade a first sub-partition, the second upgrade installation package is configured to be used to upgrade a second sub-partition, the first sub-partition and the second sub-partition are comprised in a plurality of sub-partitions in the dynamic partition, the first upgrade installation package comprises first data, the first data comprises partition information of the first sub-partition, the second upgrade installation package comprises second data, and the second data comprises partition information of the second sub-partition;

obtaining a plurality of third description groups based on third data and a plurality of second description groups, wherein the third data comprises the partition information of the first sub-partition and the partition information of the second sub-partition, the plurality of third description groups comprise a description group corresponding to the first sub-partition, a description group corresponding to the second sub-partition, and a description group corresponding to a third sub-partition, and the third sub-partition is a sub-partition in the dynamic partition other than the first sub-partition and the second sub-partition; and restarting the electronic device, loading data in the basic partition, a second static partition, and the dynamic partition to run a second operating system, reading values of address entries in the plurality of third description groups in the process of loading the data in the dynamic partition to run the second operating system, and loading the data in the dynamic partition to run the second operating system based on the values of the address entries in the plurality of third description groups.

* * * * *